(12) United States Patent
Taniguchi et al.

(10) Patent No.: US 7,366,987 B2
(45) Date of Patent: Apr. 29, 2008

(54) INTERRUPT PROCESSING IN DISPLAY CONTROL

(75) Inventors: Shinya Taniguchi, Suwa (JP); Yoshiki Fukui, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 680 days.

(21) Appl. No.: 10/245,368

(22) Filed: Sep. 18, 2002

(65) Prior Publication Data

US 2004/0051702 A1 Mar. 18, 2004

(51) Int. Cl.
G06F 3/00 (2006.01)
G06F 9/00 (2006.01)
G06F 17/00 (2006.01)

(52) U.S. Cl. ............... 715/732; 715/753; 715/751; 715/762

(58) Field of Classification Search ............ 715/732, 715/760, 762, 763, 764, 751, 753; 345/531, 345/535, 2.1
See application file for complete search history.

(56) References Cited

U.S. PATENT DOCUMENTS

| | | | | |
|---|---|---|---|---|
| 5,481,274 A | * | 1/1996 | Aratani et al. ............ 345/98 |
| 5,790,084 A | * | 8/1998 | Hix et al. ................. 345/7 |
| 5,881,266 A | * | 3/1999 | Matsumoto ............... 711/134 |
| 5,919,255 A | * | 7/1999 | Seshan et al. ............ 710/262 |
| 6,065,106 A | * | 5/2000 | Deao et al. ............... 712/24 |
| 6,473,088 B1 | * | 10/2002 | Matsumoto et al. ....... 345/530 |
| 6,839,061 B1 | * | 1/2005 | Kamakura et al. ........ 345/520 |
| 2002/0002668 A1 | * | 1/2002 | Miura et al. ............. 712/244 |
| 2002/0080091 A1 | * | 6/2002 | Acharya et al. .......... 345/2.1 |
| 2004/0125081 A1 | * | 7/2004 | Hayakawa ................ 345/156 |

FOREIGN PATENT DOCUMENTS

| | | |
|---|---|---|
| JP | A 10-13720 | 1/1998 |
| JP | A 2000-152125 | 5/2000 |

* cited by examiner

Primary Examiner—Tadesse Hailu
Assistant Examiner—Anita Datta Chaudhuri
(74) Attorney, Agent, or Firm—Oliff & Berridge, PLC

(57) ABSTRACT

The present invention provides a display control system suitable to flexible and smooth presentation. The invention can include a projector that stores page data included in projector display data in a stack area by a stack system in which the page data corresponding to the last page is at the head and projects the pages by a projecting device based on the page data read from the stack area. Further, when another projector display data is received during projection, the projector additionally stores the page data included in the other received projector display data in the stack area by the stack system.

3 Claims, 12 Drawing Sheets

[FIG. 1]
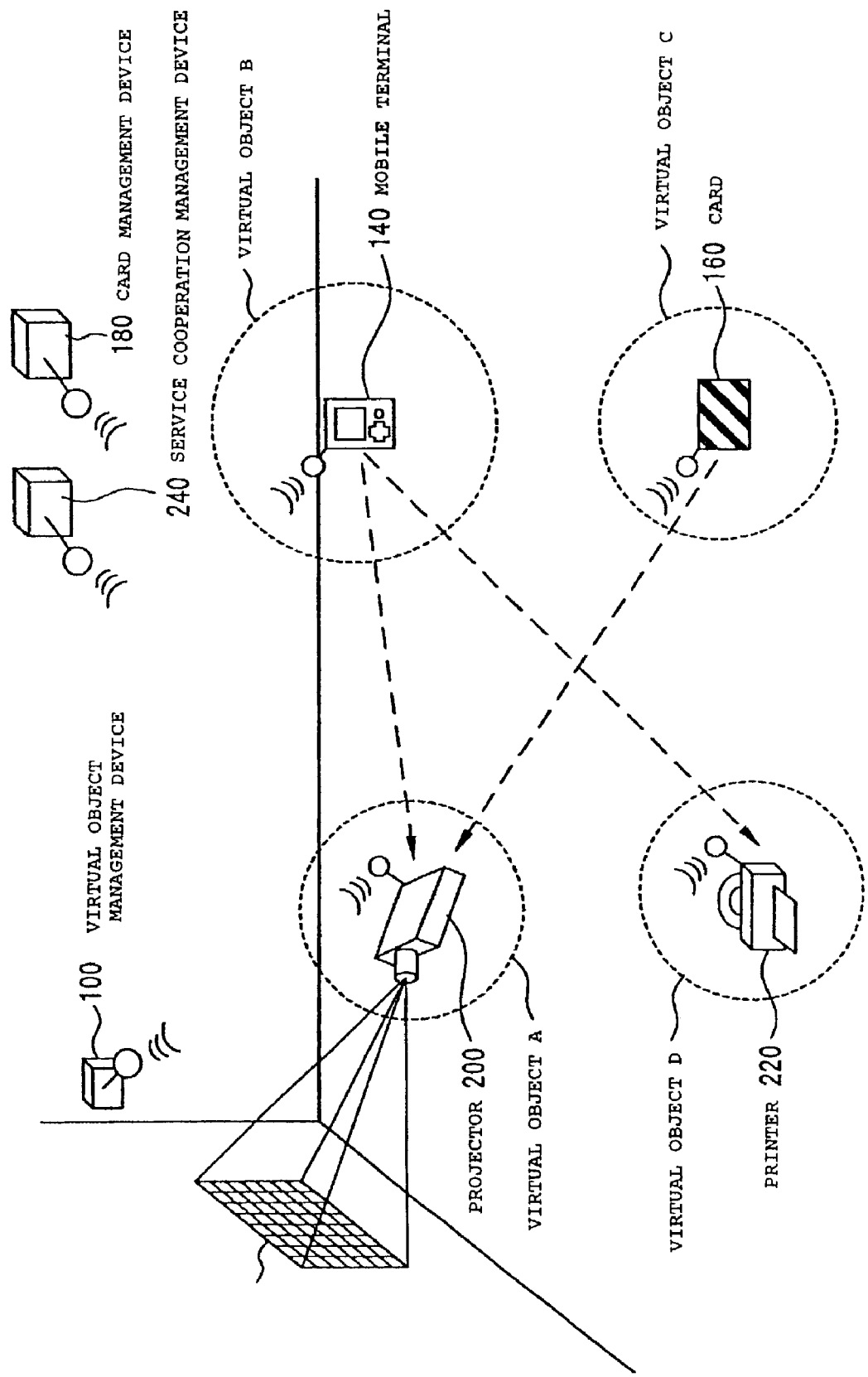

[FIG. 2]
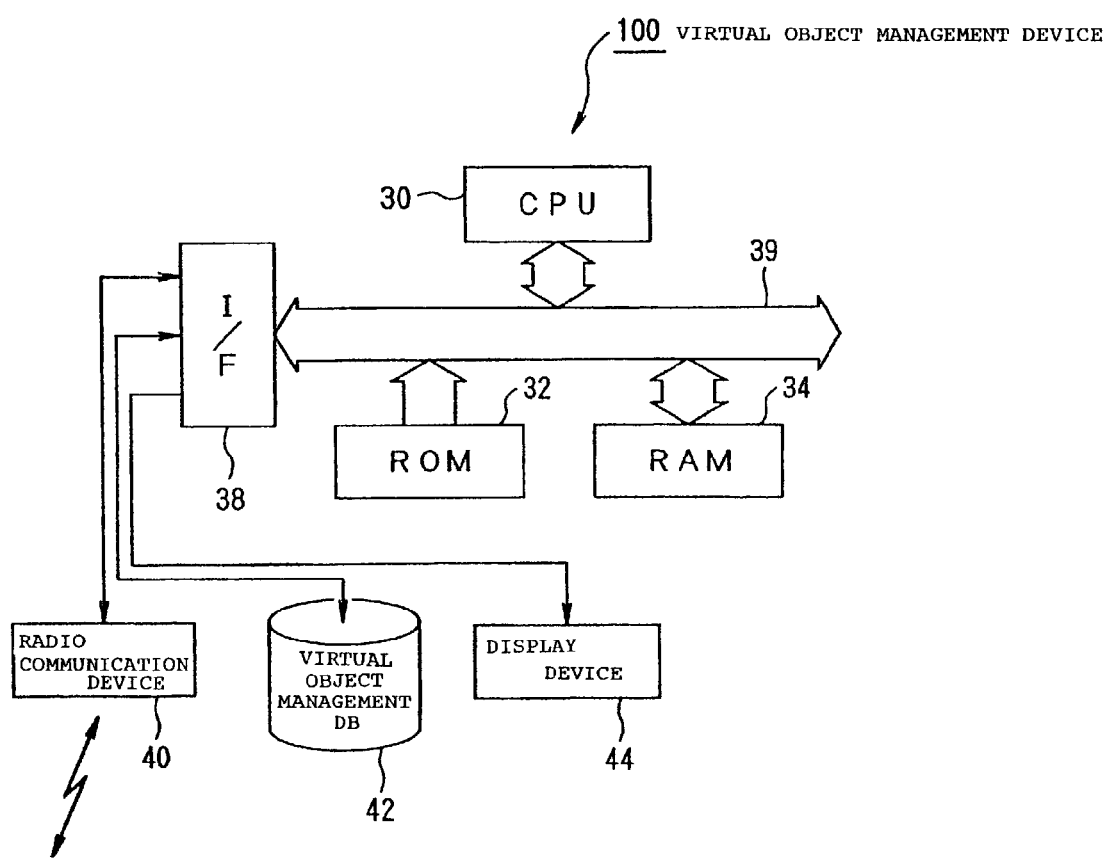

[FIG. 3]

| SERIES NO. | SERVICE TYPE | SERVICE ID | BASE POINT (x,y,z) | SHAPE | RANGE VALUE (m) | AREA-IN MANAGEMENT INFORMATION (Ex.0001,0002,...) |
|---|---|---|---|---|---|---|
| 1 | PROJECTOR SERVICE | 0001 | 10,50,20 | SPHERICAL | 2 | |
| 2 | PDA SERVICE | 0002 | 30,40,20 | SPHERICAL | 1 | 0001 |
| 3 | PRINTER SERVICE | 0003 | 30,40,20 | SPHERICAL | 2 | |
| 4 | CARD SERVICE | 0004 | 30,40,20 | SPHERICAL | 2 | |

SERVICE INFORMATION: columns 404, 406
OBJECT INFORMATION: columns 408, 410, 412

[FIG. 4]
500 COMMUNICATION INFORMATION REGISTERING TABLE
| SERVICE ID | SERVICE TYPE | COMMUNICATION INFORMATION |
|---|---|---|
| 0001 | PROJECTOR SERVICE | OBJECT DATA A FOR COMMUNICATION |
| 0002 | PDA SERVICE | OBJECT DATA B FOR COMMUNICATION |
| 0003 | PRINTER SERVICE | OBJECT DATA C FOR COMMUNICATION |
| 0004 | CARD SERVICE | OBJECT DATA D FOR COMMUNICATION |
502, 504, 506
[FIG. 5]
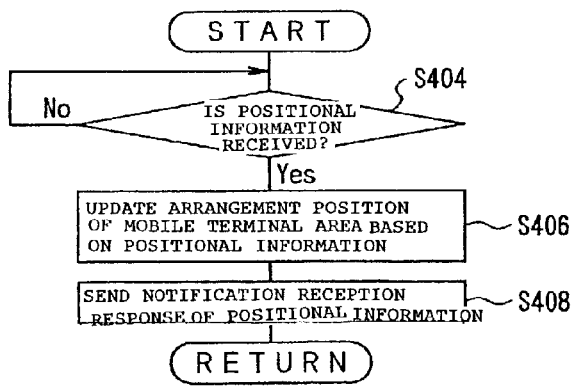

[FIG. 6]
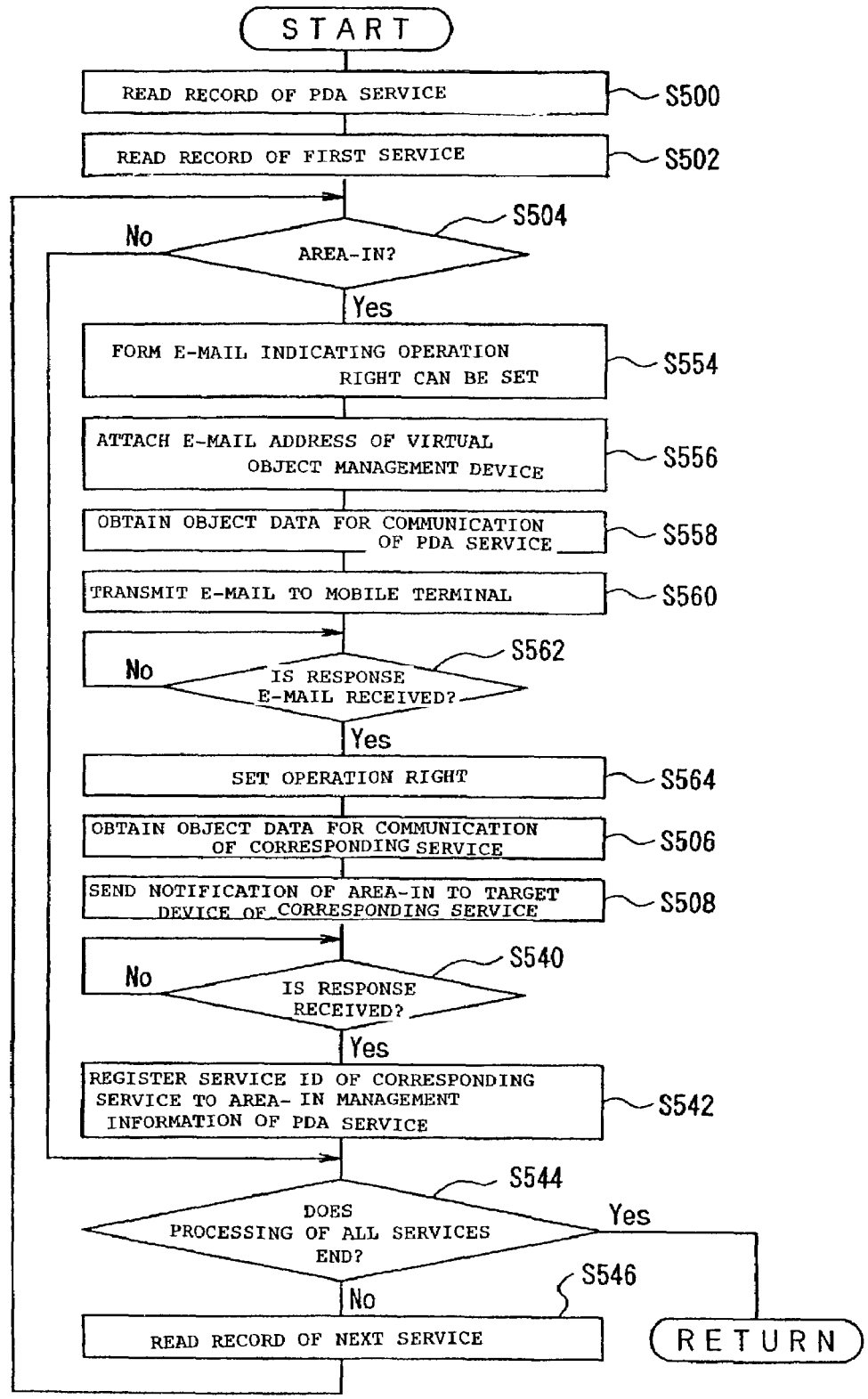

[FIG. 7]
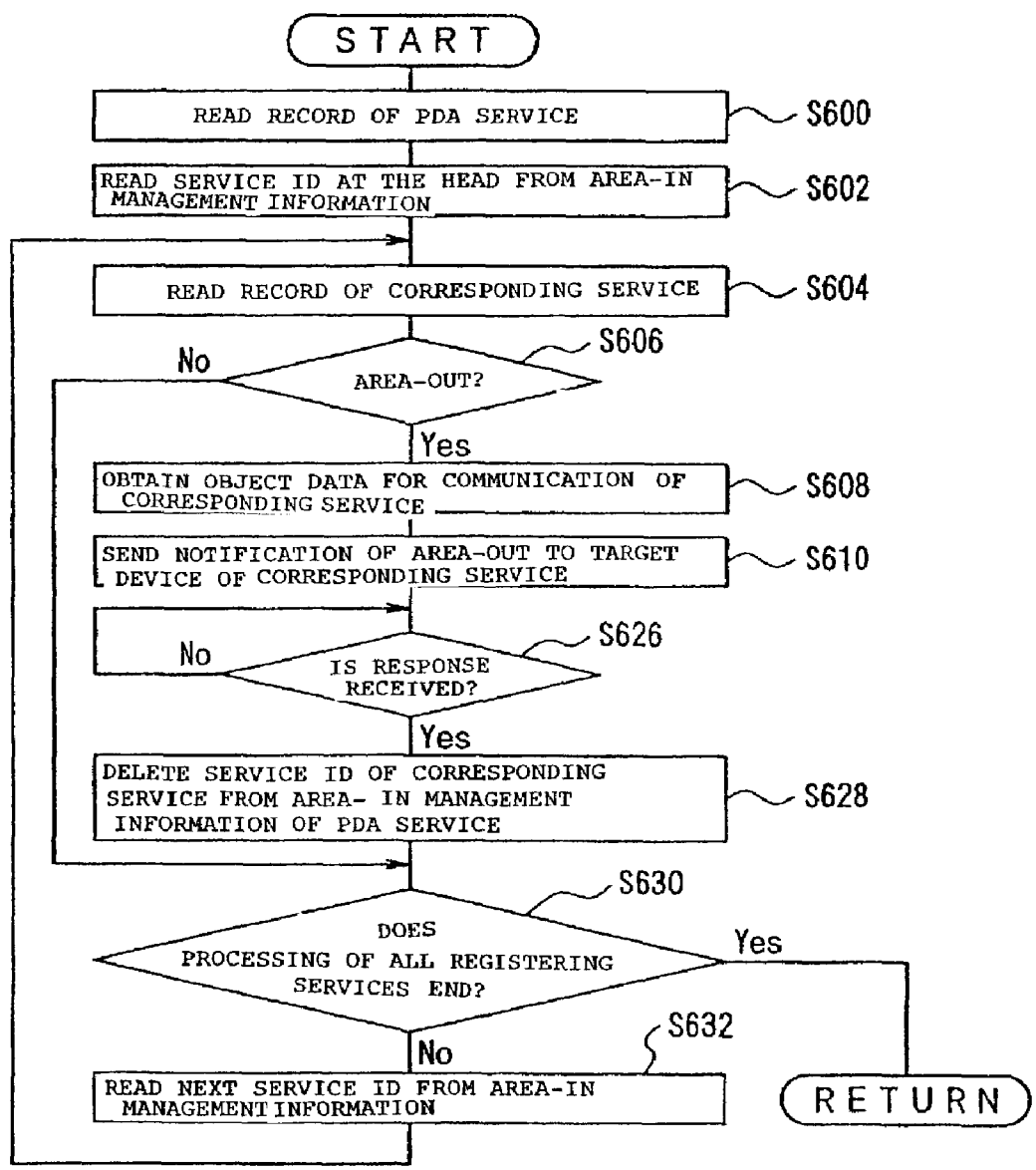

[FIG. 8]
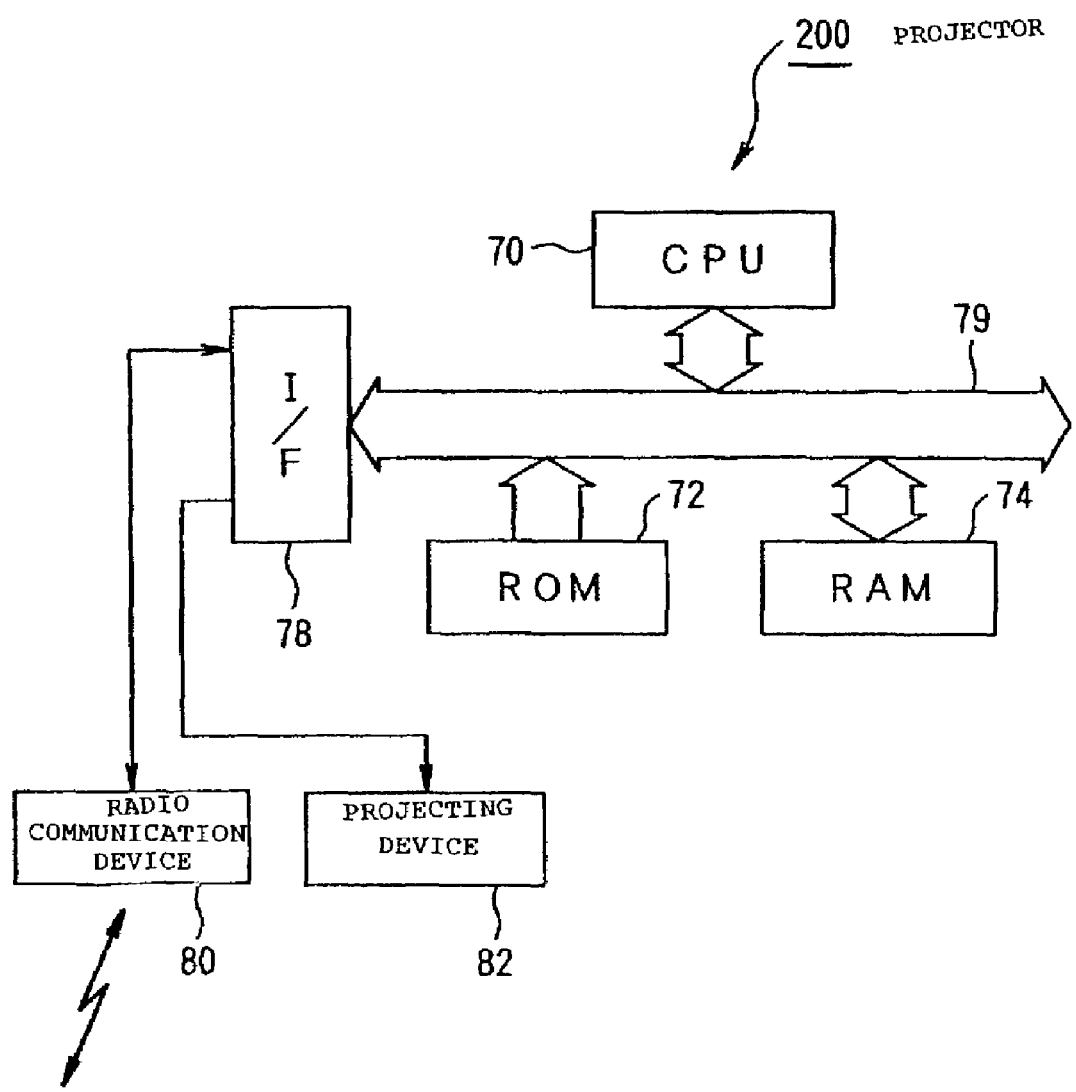

[FIG. 9]
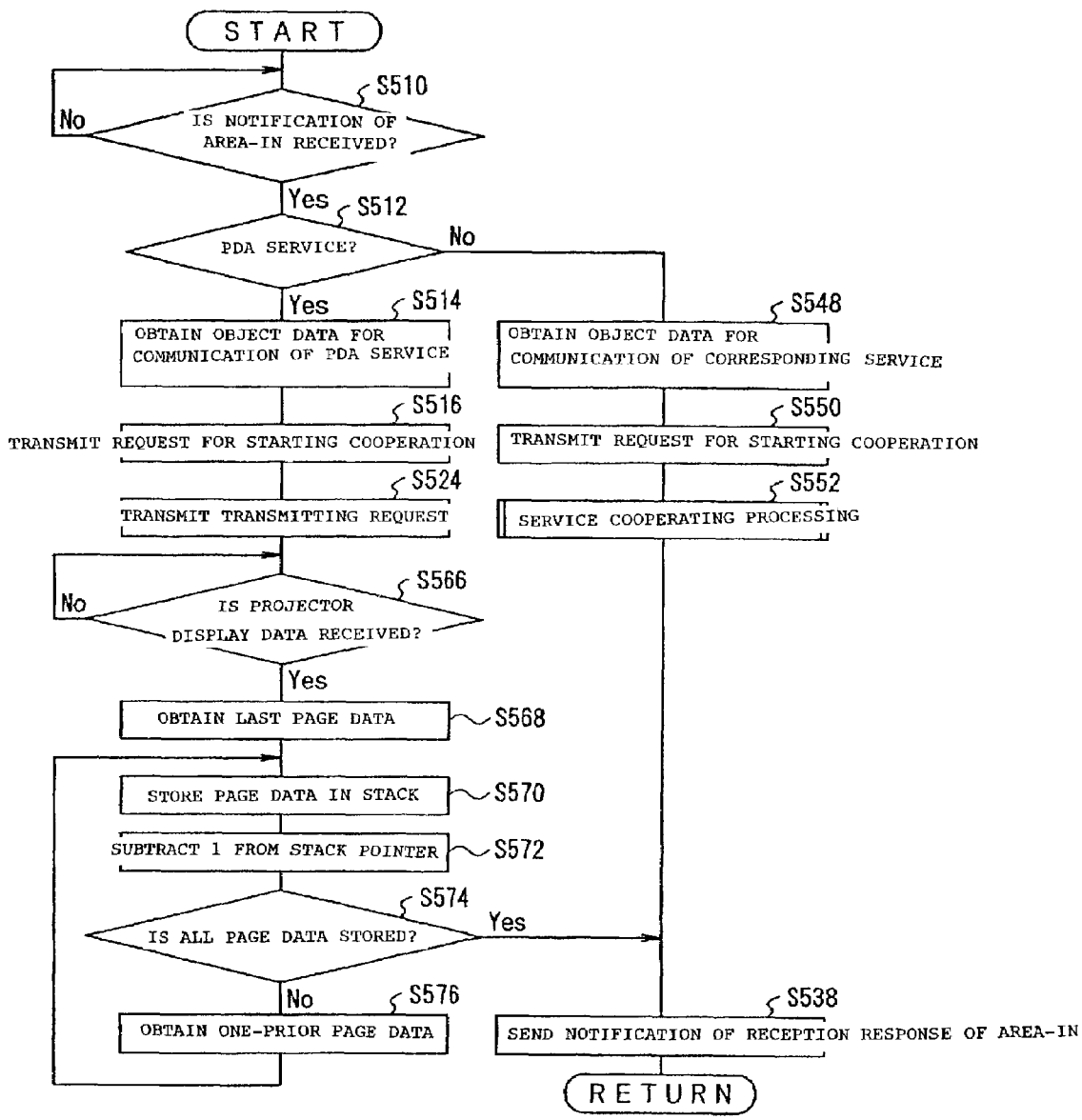

[FIG. 10]
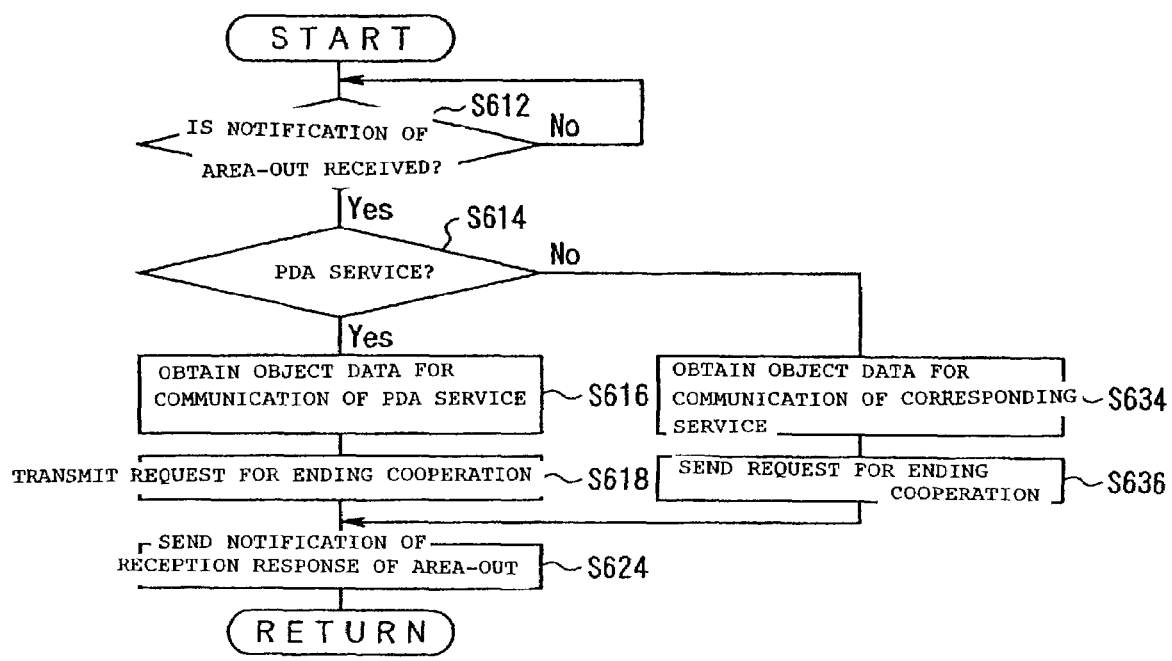

[FIG. 11]
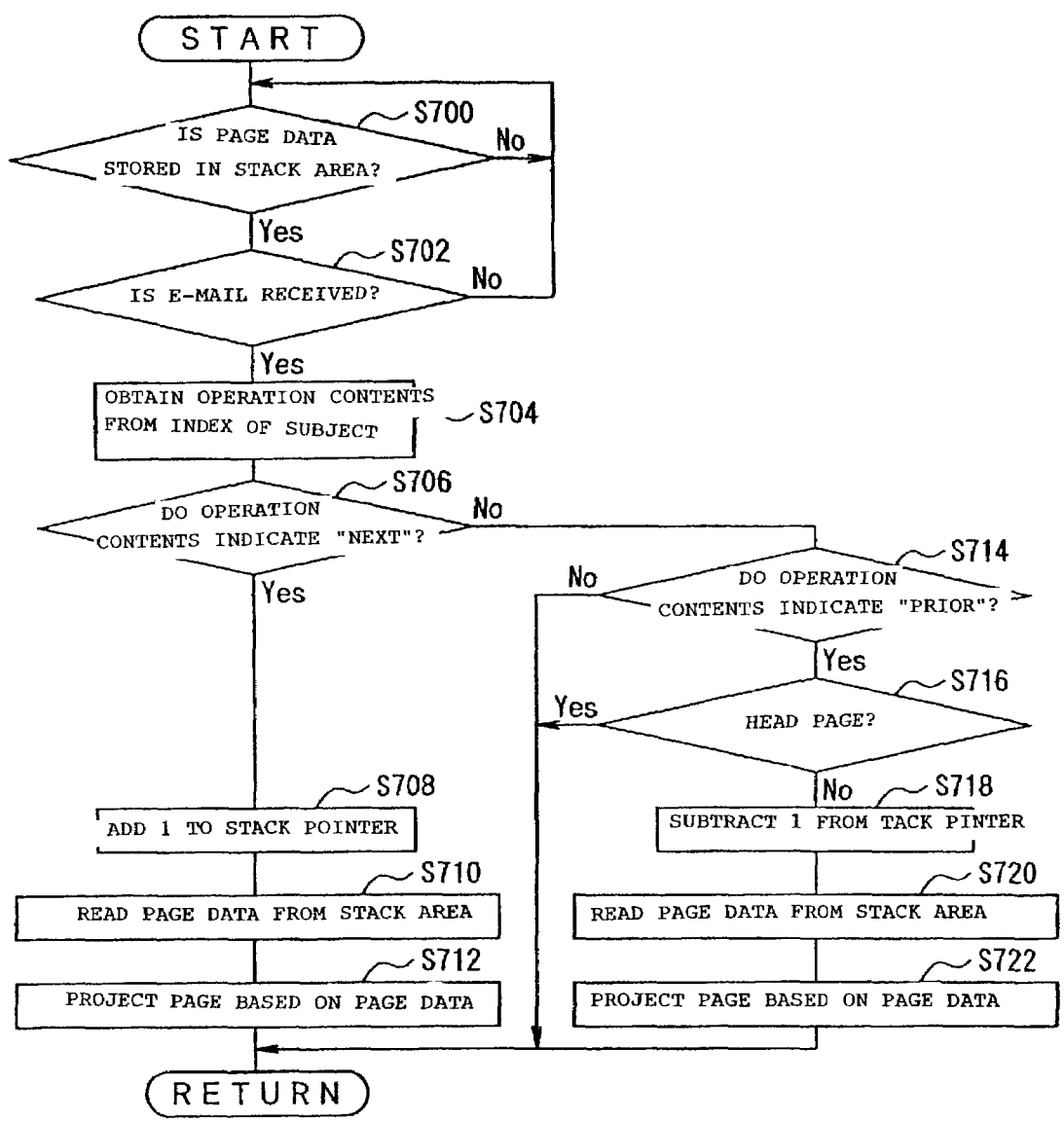

[FIG. 12]
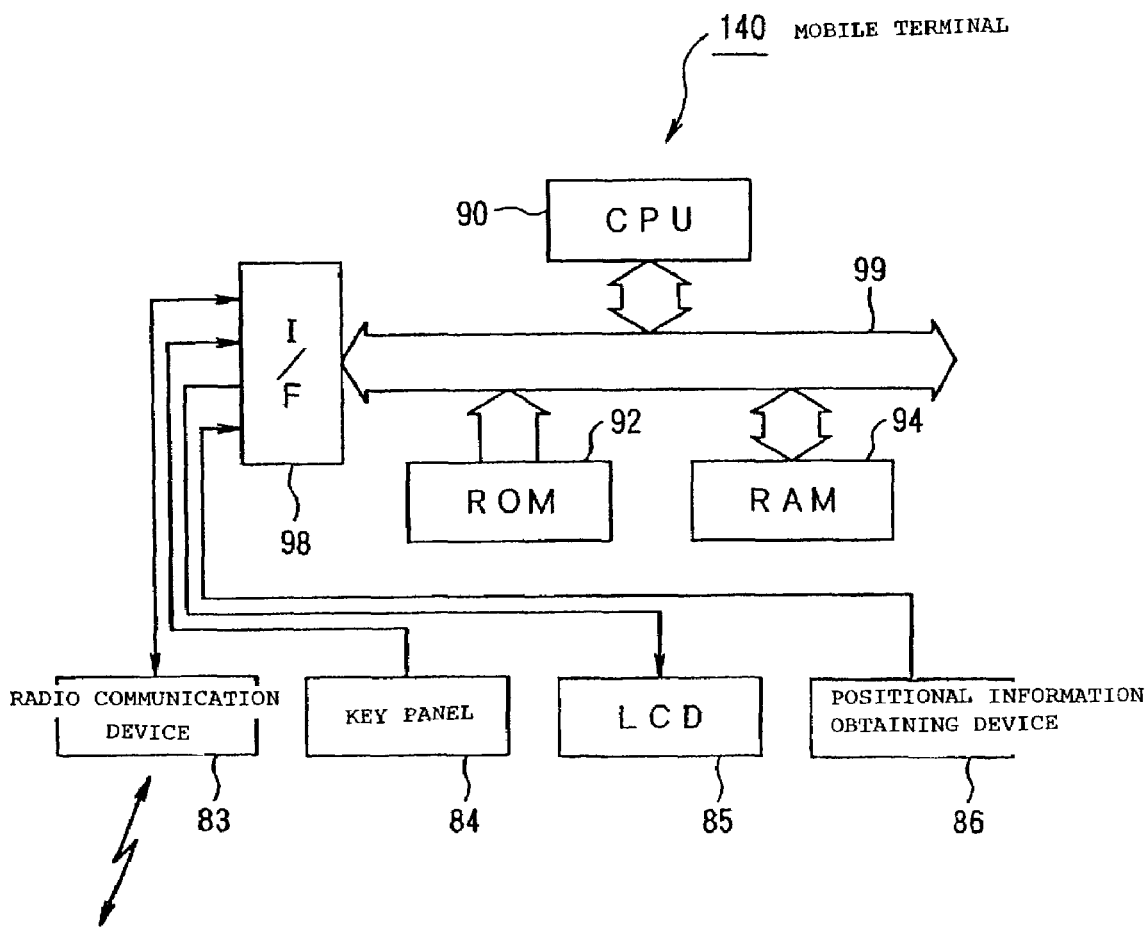
[FIG. 13]
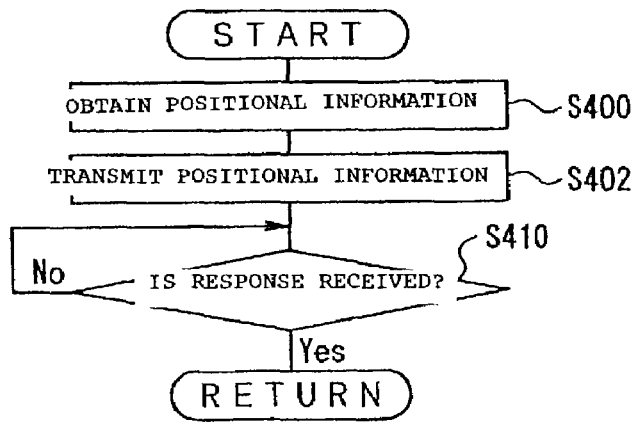

[FIG. 14]
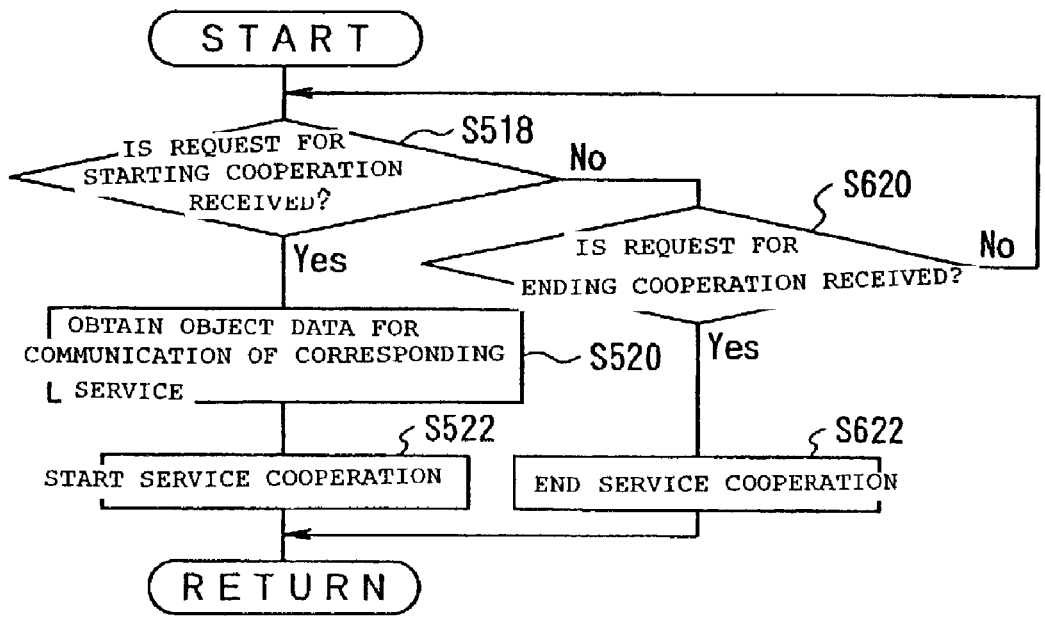
[FIG. 15]
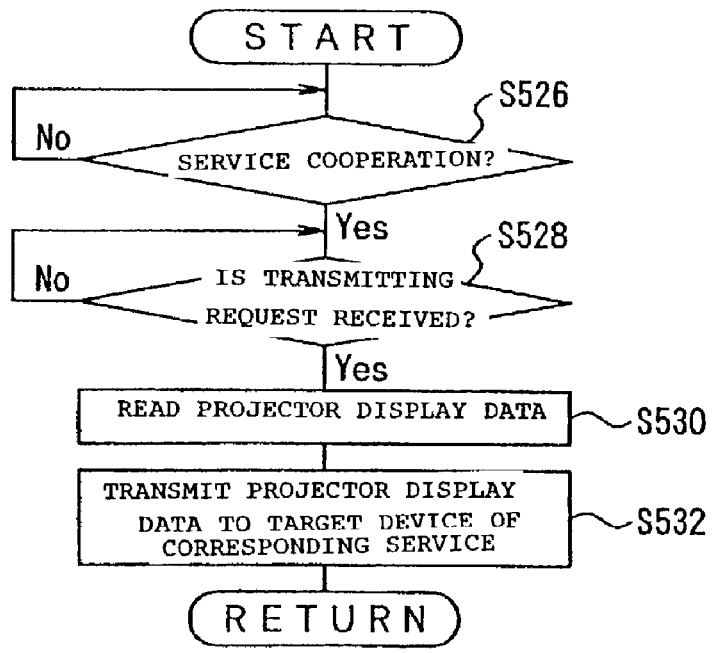

INTERRUPT PROCESSING IN DISPLAY CONTROL

BACKGROUND OF THE INVENTION

1. Field of Invention

The present invention relates to a system, a terminal, a mobile device, a program, and a method for allowing virtual objects to correspond to a display device such as a projector and the mobile device such as a mobile terminal, arranging the virtual objects on virtual space corresponding to actual space, and providing display services by the display device based on the positional relationship of the virtual objects. More particularly, the present invention can relate to control system, service providing system, control program, and control method, which are suitable to flexible and smooth presentation.

2. Description of Related Art

Related-art projectors for projecting an image on a screen includes, for example, one for, when being given projector display data including one or plural page data which have display contents segmented by page unit, displaying pages in predetermined order based on the given projector display data, referred to as a first related art.

According to the first related art, the projector can include a projecting device for projecting the image on the screen, and a projecting control device for controlling the projecting operation for projecting pages in predetermined order based on the projector display data by using the projecting device. The projecting control device can obtain the page data from the projector display data in predetermined order starting the head page, and the projecting device can project the page based on the obtained page data.

On the other hand, the most general projector can include a connecting terminal for connecting a computer and the like and a projecting device for projecting an image on a screen based on an image signal inputted via the connecting terminal, referred to as a second related art. In the second related art, each presenter connects the projector with a notebook-type computer or the like that stores the projector display data projecting by the projector as a presentation material. Further, each presenter can perform the presentation while projecting the presentation material on the screen by operating the notebook-type computer or the like.

Since the presentation material is stored in the notebook-type computers of the presenters in many cases, the notebook-type computers must be connected to the projector every presentation unless collecting the material for the presentation of the presenters in the single notebook-type computer according to the second related art. Thus, the connecting operation is troublesome and complicated for the presenter and the operation for carrying the notebook-type computer, etc. to a meeting place for the presentation requires labor. In particular, upon presentation at a relatively wide meeting place, all the presenters hardly collect their materials for the presentation in the single computer. The collecting operation requires a large amount labor by an organizer.

The system construction in which the material for the presentation individually formed by the presenters is easily presented is expected to omit the operation for carrying the notebook-type computers by the presenters and to eliminate the complicated operation for collecting the materials for the presentation to the single computer. For example, according to one method, the projector can be connected to a predetermined server to enable the communication, the presenter stores the material for the presentation in the predetermined server in advance, and the material for the presentation is automatically read and displayed from the predetermined server upon presentation. In this case, the key is that the material for the presentation of the presenter can be read upon his or her presentation. In other words, the material for the presentation can be read corresponding to the presenter. With the structure for realizing the method, projecting services are provided by using the projector in accordance with the movement of the presenter (or a relatively small thing which the presenter carries).

With respect to the above-mentioned structure for the method, some related arts are disclosed. For example, an information-presenting device is disclosed in Japanese laid-open Patent Application No. HEI 10-13720 (hereinafter, referred to as a third related art). Further, a head mounted display device is disclosed in Japanese laid-open Patent Application No. 2000-152125 (hereinafter, referred to as a fourth related art).

According to the third related art, detecting units 103 and 104 detect the position and the direction of a camera 101 by using a GPS (Global Positioning System), and a user designates an object in an image displayed on a display or a finder 108. A control unit 106 obtains positional information of the object designated based on the designated position and the detected position and direction through calculation, picks up the attribute data of the object from a map data storing unit 107 by using the obtained positional information, displays or outputs, by speech synthesis, the data on the display or the finder 108.

Accordingly, the attribute data of the object in the display image is easily obtained and is presented to the user.

According to the fourth related art, an icon image is displayed on an image output unit 5 at an eye position detected by an eye detecting unit 8 by the input operation from an operation input unit 6. The icon image is overlappingly observed on the operator's eye in the actual field of view from a window portion. The operator's eye is shifted to a desired position in the field of view and is determined by an instruction from the operation input unit 6. For example, a sentence at the present is actually observed and an area of the sentence is designated. Then, the sentence or a word in the designated area is determined from the image information inputted from a CCD camera unit 3 based on input image information by an image processing unit 7, and is translated to any language. The data is displayed on the image output unit 5.

Thus, the motion of the operator's eye enables the selection and designation of a target in the actual field of view, and the processing of the image information in the field of view by using the eye as input means.

However, the page data is obtained and projected sequentially in the predetermined order starting from the head page according to the first related art. Temporary insertion and display operation of one projector display data different from that used for the present display operation needs the closing operation of a projector display data file used for the present display operation and the opening and display operation of a file of projector display data to be inserted. Upon ending the display operation, a file of the original projector display file must be opened again and the page must advance to one before insertion. Therefore, the dynamical change of presentation contents depending on the reaction of an audience-upon presentation requires labor and time. This operation is not suitable to the flexible and smooth presentation.

According to the third related art, when the user designates the object in the image displayed on the display or the finder 108, the attribute data of the object is provided for the user. Thus, even if there is an object associated to the valid attribute data of the user, the user cannot obtain the valid attribute data unless the user gets into action actively.

Since the attribute data is provided for the user, the user can receive only a service for providing information. For example, user's desire to promptly display the contents of the attribute data associated with the object cannot be realized. Meanwhile the attribute data is stored in a memory or the like, the memory is thereafter loaded to another computer, and the attribute data is read and displayed. However, it is not convenient and the desire to promptly display the data is not satisfied.

According to the fourth related art, similarly to the third related art, the translation is performed when the user observes the sentence in front and the area of the sentence is designated. Therefore, similarly to the third related art, the translation as the service cannot be provided for the user if the user does not get into action actively.

Further, since a translation sentence is provided for the user, similarly to the third related art, the user can receive only the service for providing the information.

In the case of applying the third related art and the fourth related art to the example of the above-mentioned projector, if the user does not get into action actively, the user cannot receive the projecting service by using the projector. In particular, reading the material for the presentation corresponding to the presenter would be hard to put into practice.

SUMMARY OF THE INVENTION

The present invention pays attention to the above-mentioned problems of the related arts. Accordingly, a first object of the present invention can be to provide a display control system, a display service providing system, a display control program, and a display control method, which are suitable to flexible and smooth presentation. A second object of the present invention can be to provide a display service providing system for dynamically providing a display service in accordance with the movement, in which the user can be easily provided the display service and the display service can be provided corresponding to the user.

To achieve the above-mentioned objects of the present invention, a display control system for displaying each page in predetermined order based on given display data when the display data, including one or plural page data which have display contents segmented by page unit can be included. The display control system can include a display device, a page data storing device for storing the page data, and a display control device for controlling the display operation so that the pages are displayed on the display device in the predetermined order based on the display data. The display control device can stores the page data, included in the display data, in the page data storing device by a stack system in which the page data corresponding to the last page of the predetermined order is at the head, display the page on the display means based on the page data read from the page data storing means, and, when another display data is given upon the display control operation, additionally store the page data, included in the other given display data, in the page data storing means by the stack system.

With the above structure, the display control device stores the page data, included in the given display data, in the page data storing device by the stack system, and the pages are displayed on the display device based on the page data read from the page data storing device. When the other display data is given upon the display control operation, the display control device additionally stores the page data, included in the other received display data, in the page data storing device by the stack system, and the pages are displayed on the display device based on the page data read from the page data storing device. When the display operation suspends or ends, since the page data of the non-displayed page among the original display data is stacked in the page data storing device, the non-displayed portion of the original display data can sequentially be displayed without any operation after inserting and display operation.

Herein, the page data storing device may store the page data at any timing and by any device, may store the page data in advance, or may store the page data by an external input upon operating the present system without storing the page data in advance. The above-mentioned operation is the same as that in the above display service providing system, and in the above display control system.

The present system may be implemented as a single device or may be implemented as a network system which is connected to a plurality of terminals to enable the communication. In the later case, if components are connected each other to enable the communication, each of the structural components may belong to any of the plurality of terminals. For example, the display means and the display control means may individually be provided for different terminals. The above-mentioned operation is the same as that of the display control system.

Further, according to the present invention, a display control system for displaying each page in predetermined order based on given display data when the display data, including one or plural page data which have display contents segmented by page unit, are given. The display control system can include a display device, and display control device for controlling the display operation so that the pages are displayed on the display device in the predetermined order based on the display data. When another display data is given upon the display control operation, the display control device stores a position of the page during the display operation among the present display data used for the present display operation as a return pointer, suspends the display control operation based on the present display data and starts the display operation based on the other given display data, and when the display control operation based on the other display data suspends or ends, returns the display control operation based on the present display data from the page during the display operation, based on the present display data and the stored return pointer.

With the above-mentioned structure, when the display data is given, the display control device displays the pages on the display device in the predetermined order based on the given display data. When the other display data is given upon the display control operation, the display control device stores the position of the page during the display operation among the present display data as the return pointer, the display control operation based on the present display data suspends, pages are displayed on the display device in the predetermined order based on the other display data. When the display operation suspends or ends, the display control operation based on the present display data is returned from the page during the display operation on the basis of the present display data and the stored return pointer. Therefore, the non-displayed portion of the original display data can sequentially be displayed without any operation after inserting and display operation.

To achieve the above-mentioned objects, according to the device the present invention, a display service providing system for allowing a display apparatus to correspond to a first virtual object and allowing a mobile device to correspond to a second virtual object, for arranging the first virtual object on virtual space corresponding to real space and arranging the second virtual object at the position of the mobile device in the virtual space or adjacently thereto, and for providing a display service for display operation of the display apparatus corresponding to the first virtual object based on a positional relationship between the first virtual object and the second virtual object. The display service providing system can include a first storing device for storing first object information on the shape and the arrangement position of the first virtual object, corresponding to the display apparatus, second storing device for storing second object information on the shape and the arrangement position of the second virtual object, corresponding to the mobile device, a display data storing device for storing display data including one or plural page data which have display contents segmented by page unit, corresponding to the mobile device, and a positional information obtaining device for obtaining positional information for specifying the position of the mobile device. The second object information of the second storing device being updated based on the positional information obtained by the positional information obtaining device, and when it is determined, based on the first object information of the first storing device and the second object information of the second storing device, that an area specified by the shape and the arrangement position of the first virtual object is overlapped with an area specified by the shape and the arrangement position of the second virtual object, the display data of the display data storing device, corresponding to the mobile device as the second virtual object, is transmitted to the display device as the first virtual object. The display apparatus including a display device, a page data storing device for storing the page data, and display control device for controlling the display operation so that the pages are displayed on the display device in predetermined order based on the display data. The display control device stores the page data included in the display data by a stack system in the page storing device, in which the page data corresponding to the last page of the predetermined order is at the head. The page is displayed on the display device based on the page data read from the page data storing device, and when another display data is received upon the display control operation, the page data included in the other received display data is additionally stored in the page data storing device by the stack system.

With the above-mentioned structure, when the display data is given to the display device, the display control device stores the page data, included in the given display data, in the page data storing device by the stack system, and the pages are displayed on the display device based on the page data read from the page data storing device.

On the other hand, the positional information obtaining device obtains the positional information and updates the second object information of the second storing device based on the obtained positional information. It is determined, based on the first object information of the first storing device and the second object information of the second storing device whether or not the area specified by the shape and the arrangement position of the first virtual object is overlapped with the area specified by the shape and the arrangement position of the second virtual object. That is, the state in which the mobile device is close to the first virtual object or adjacently thereto results in determining that the areas are overlapped. When determining the overlapping, the display data of the display data storing device, corresponding to the mobile device as the second virtual object, is transmitted to the display device as the first virtual object.

When the other display data is received upon the display control operation, the display control device additionally stores the page data, included in the other received display data, in the page data storing device, and displays the pages on the display device based on the page data read from the page data storing device. When the display operation suspends or ends, the page data storing device stacks the page data of the non-display page among the original display data and, therefore, the non-display portion of the original display data is continuously displayed without any operation after inserting and display operation.

Herein, the virtual objects have logical shapes and arrangement positions on virtual space corresponding to real space. The shapes may be spherical with a radius of 1 [m] from the arrangement position as center, or may be cubical with one side of 1 [m] from the arrangement position as center. Further, they can include any shape, such as the shape of copying creation like natural things and living creatures. Further, the virtual objects have not only solid shapes but also planar shapes. Thus, since the areas received the display service are relatively clear, the display services varied depending on fine unit such as several-meter unit can be provided. The area for providing the display service and the area corresponding to the mobile device have not the point but a predetermined range and the user easily receives the display service. The above operation is the same as that of the above display service providing system.

The mobile device may be that in real space or that in virtual space. A mobile terminal, a vehicle, and the like correspond to the mobile device in the former case and, by this application, the display service corresponding to the user's position can be provided. A mobile device on computer simulation and a mobile device on a game correspond to the mobile device in the latter case and, by application to the computer simulation, the display service can be provided corresponding to the position of the mobile device in virtual space. The above operation is the same as that of the above-described display service providing system.

The transmission of the display data device that the display data is directly or indirectly transmitted. In the indirect transmission, for example, the display data is connected to an external terminal capable of transmitting it to enable the communication, the present system sends a request for transmitting the display data to the external terminal, and the request for the transmission of the external terminal leads the transmission of the display data. That is, the display data can be transmitted in cooperation with the present system and one or plural external terminals. The above operation is the same as that of the above display service providing system.

The first storing device stores the first object information by any means at any period. The first storing device may store the first object information in advance, or may store the first object information by the external input or the like upon operating the present system without storing the first object information in advance. This is the same as that in the case of storing the second object information in the second storing device. The above operation is the same as that of the display service providing system.

The present system may be implemented as a single device or may be implemented as a network system in which a plurality of terminals is connected for the communication. In the latter case, if components are connected each other to enable the communication, each of the structural components may belong to any of the plurality of terminals. The above operation is the same as that of the display service providing system.

The positional information obtaining device may obtain the positional information by measuring the position of the mobile device by using a communication terminal connected to the mobile device for communication. Alternatively, it may obtain the positional information by measuring the position of the mobile device by using a GPS or the like, or by calculating the position of the mobile device based on the measured information from the mobile device. Further, the positional information obtaining device may obtain the positional information by measuring the position of the mobile device by using a base station connected to the mobile device, or by calculating the position of the mobile device based on the measured information from the base station by using the communication terminal. The above operation is the same as that of the above-described display service providing system.

Further, according to the present invention, a display service providing system for allowing a display apparatus to correspond to a first virtual object and allowing a mobile device to correspond to a second virtual object, for arranging the first virtual object on virtual space corresponding to real space and arranging the second virtual object at the position of the mobile device in the virtual space or adjacently thereto, and for providing a display service for display operation of the display apparatus corresponding to the first virtual object based on a positional relationship between the first virtual object and the second virtual object. The display service providing system can include a first storing device for storing first object information on the shape and the arrangement position of the first virtual object, corresponding to the display apparatus, a second storing device for storing second object information on the shape and the arrangement position of the second virtual object, corresponding to the mobile device, a display data storing device for storing display data which have display contents segmented by page unit, corresponding to the mobile device, and a positional information obtaining device for obtaining positional information for specifying the position of the mobile device. The second object information of the second storing device is updated based on the positional information obtained by the positional information obtaining device, and when it is determined, based on the first object information of the first storing device and the second object information of the second storing device, that an area specified by the shape and the arrangement position of the first virtual object is overlapped with an area specified by the shape and the arrangement position of the second virtual object. The display data of the display data storing device, corresponding to the mobile device as the second virtual object, is transmitted to the display apparatus as the first virtual object. The display apparatus including a display device, and display control device for controlling the display operation so that the pages are displayed on the display device in predetermined order based on the display data. When another display data is received upon the display control operation, the display control device stores a position of the page during display operation among the present display data used for the present display operation as a return pointer, suspends the display control operation based on the present display data and starts the display operation based on the other received display data, and when the display control operation based on the other display data suspends or ends, returns the display control operation based on the present display data from the page during the display operation, based on the present display data and the stored return pointer.

With the above-mentioned structure, the display device receives the display data, and then the display control device displays the pages, in the display device, in the predetermined order based on the received display data.

On the other hand, the positional information obtaining device obtains the positional information and updates the second object information of the second storing device based on the obtained positional information. It is determined, based on the first object information of the first storing device and the second object information of the second storing device, whether or not the area specified by the shape and the arrangement position of the first virtual object is overlapped with the area specified by the shape and the arrangement position of the second virtual object. In other words, when the mobile device is close to the area of the first virtual object or adjacently thereto, it is determined that the areas are overlapped. When determining the overlapping, the display data of the display data storing device, corresponding to the mobile device as the second virtual object, is transmitted to the display device as the first virtual object.

When the display device receives the other received data upon the display control operation, the display control device stores the position of the page during the display operation among the present display data as the return pointer, the display control operation based on the present display data suspends, and the pages are displayed on the display device in the predetermined order based on the other display data. When the display operation suspends or ends, the display control operation based on the present display operation is returned from the pages during the display operation on the basis of the present display data and the stored return pointer. Therefore, the non-display portion of the display data can continuously be displayed without any operation after inserting and display operation.

Further, according to the present invention, in the above-described display service providing system, a virtual object management terminal for managing the virtual object can be communicated with and be connected to the mobile device. The mobile terminal can include the positional information obtaining device, and transmits the positional information obtained by the positional information obtaining device to the virtual object management terminal, and the virtual object management terminal includes the first storing means and the second storing device, when the positional information is received, updates the second object information of the second storing means based on the received positional information, and determines, based on the first object of the first storing means and the second object information of the second storing device, whether or not the area specified by the shape and the arrangement position of the first virtual object is overlapped with the area specified by the shape and the arrangement position of the second virtual object.

With the above-mentioned structure, in the mobile device, the positional information obtaining device can obtain the positional information and transmits the obtained positional information to the virtual object management terminal.

In the virtual object management terminal, the positional information is received, and the second object information of the second storing device is updated based on the received positional information. It is determined, based on the first object information of the first storing device and the second object information of the second storing device, whether or not the area specified by the shape and the arrangement position of the first virtual object is overlapped with the area specified by the shape and the arrangement position of the second virtual object.

Herein, the display data can be transmitted at any place not only by the virtual object management terminal but also by the mobile device or another device. In the case of transmitting the display data by using the virtual object management terminal, for example, when it is determined that the area of the first virtual object is overlapped with the area of the second virtual object, the virtual object management may transmit the display data to the display device as the first virtual object. In the case of transmitting the display data by using the mobile device, the virtual object management terminal may transmit the determination result to the mobile device, and the mobile device receives the determination. If the received determination indicates that area of the first virtual object is overlapped with the area of the second virtual object, the display data may be transmitted to the display device as the first virtual object.

The virtual object management terminal may be a communication device connected to one communication path to the mobile device and may have at least a server function. Further, the virtual object management terminal may have both a client function and the server function. The above operation is the same as that of the above display service providing system.

The transmission of the positional information device that the mobile device directly or indirectly transmits the positional information to the virtual object management terminal. In the case of indirectly transmitting the positional information, for example, the present system is connected to an external terminal for communication, and the mobile device may transmit the positional information to the virtual object management terminal via the external terminal. That is, the positional information can be transmitted in cooperation with the mobile device and one or plural external devices.

Furthermore, according to the present invention, in the above-described display service providing system, a virtual object management terminal for managing the virtual object can be communicated with and be connected to the mobile device. The virtual object management terminal can include the first storing device, and transmits the first object information of the first storing device to the mobile device. The mobile device can include the second storing device and the positional information obtaining device, updates the second object information of the second storing device based on the positional information obtained by the positional information obtaining device, and when the first object information is received, determines, based on the received first object information and the second object information of the second storing device, whether or not the area specified by the shape and the arrangement position of the first virtual object is overlapped with the area specified by the shape and the arrangement position of the second virtual object.

With the above-mentioned structure, in the virtual object management terminal, the first object information of the first storing means is transmitted to the mobile device.

In the mobile device, the positional information obtaining device obtains the positional information and updates the second object information of the second storing device based on the obtained positional information. The first object information is received, and then it is determined, based on the received first object information and the second object information of the second storing device, whether or not the area specified by the shape and arrangement position of the first virtual object is overlapped with the area specified by the shape and arrangement position of the second virtual object.

Herein, the display data can be transmitted at any place not only by the virtual object management terminal, but also by the mobile device or another device. In the case of transmitting the display data by using the mobile device, for example, the virtual object management terminal transmits the first object information of the first storing device to the mobile device, and the mobile device receives the first object information. If the mobile device determines, based on the received first object information and the second object information of the second storing device, that the area of the first virtual object is overlapped with the area of the second virtual object, the display data may be transmitted to the display device as the first virtual object. In the case of transmitting the display data by using the virtual object management terminal, for example, the mobile device transmits the determination result to the virtual object management terminal. The virtual object management terminal receives the determination result, and if the received determination result is that the area of the first virtual object is overlapped with the area of the second virtual object, the display data may be transmitted to the display device as the first virtual object.

The transmission of the first object information device that the virtual object management terminal directly or indirectly transmits the first object information. In the case of indirectly transmitting the first object information, the virtual object management terminal is connected to an external terminal for communication, and the virtual object management terminal may transmit the first object information to the mobile device via the external terminal. That is, the first object information can be transmitted in cooperation with one or plural external terminals.

Further, according to the present invention, in the above display service providing system, the display device is a projection-type display device.

With the above-mentioned structure, the positional information obtaining device obtains the positional information and updates the second object information of the second storing device based on the obtained positional information. It is determined, based on the first object information of the first storing device and the second object information of the second storing device, whether or not the area specified by the shape and the arrangement position of the first virtual object is overlapped with the area specified by the second virtual object. In other words, a status in which the mobile device is close to the area of the first virtual object or adjacently thereto results in determining that the areas are overlapped. When determining the overlapping, the display data of the display data storing device, corresponding to the mobile device as the second virtual object, is transmitted to the projecting-type display device as the first virtual object.

To achieve the above-mentioned object of the present invention, in a display control program executed by a computer including, a display device, and a page data storing device for storing display data, as the page data unit, including one or more page data which have display contents segmented by page unit. When the display data is given, the program can execute processing implemented by display control device for controlling display operation for displaying the pages on the display device in predetermined order based on the given display data, and the display control device stores the page data included in the display data to the page data storing means by a stack system in which the page data corresponding to the last page in the predetermined order is at the head, displays the page on the display device based on the page data read from the page data storing device, and when another display data is given upon the display control operation, additionally stores the page data, included in the other given display data, in the page data storing device by the stack system.

With above-mentioned structure, the computer reads the program. Then, the computer executes the processing in accordance with the read program, and thus the same operations as those of the above display control system can be achieved.

To achieve the above-mentioned objects of the present invention, in a display control program executed by a computer having display device, when being given display data which have display contents segmented by page unit, the program executes processing implemented by display control device for controlling display operation for displaying pages on the display device in predetermined order based on the given display data. Further, when another display data is given upon the display control operation, the display control device stores the position of the page during the display operation among the present display data used for the present display operation as a return pointer, suspends the display control operation based on the present display data and starts the display control operation based on the other given display data, and when the display control operation based on the other display data suspends or ends, returns the display control operation based on the present display data from the page during the display operation, based on the present display data or the stored return pointer.

With the above-mentioned structure, the computer reads the program. Then, the computer executes the processing in accordance with the read program, and thus the same operations as those of the display control system can be obtained.

To achieve the above-mentioned objects according to the present invention, a display control method for, when being given display data including one or plural page data which have display contents segmented by page unit, displaying pages in predetermined order based on the given display data. The display control method can include a stack storing step of storing the page data included in the display data by a stack system in which the page data corresponding to the last page in the predetermined order is at the head, a display control step of controlling display operation for displaying the page on the display means based on the page data read from the page data storing device, and a stack additionally storing step of, when another display data is given upon the display operation, additionally storing the page data, included in the other given display data, in the page data storing means by the stack system.

Further, according to the present invention, a display control method for, when being given display data which have display contents segmented by page unit, displaying pages in predetermined order based on the given display data. The display control method can include a return pointer storing step of, when another display data is given upon display operation for displaying the pages on display means in the predetermined order based on the display data, storing the position of the page during the display operation among the present display data used for the present display operation as a return pointer, a display control switching step of, when the another display data is given upon the display operation, suspending the display control operation based on the present display data and starting the display operation based on the given another display data, and a display control returning step of, when the display control operation based on the given another display data suspends or ends, returning the display control operation based on the present display data from the page during the display operation on the basis of the present display data and the return pointer stored in the return pointer storing step.

BRIEF DESCRIPTION OF THE DRAWINGS

The invention is described with reference to the following figures, wherein like numerals represent like elements, and wherein:

FIG. 1 is a diagram showing the structure of an exemplary network system of the present invention;

FIG. 2 is an exemplary block diagram showing the structure of a virtual object management device 100;

FIG. 3 is a diagram showing the data structure of a virtual object management table 400;

FIG. 4 is a diagram showing the data structure of a communication information registering table 500;

FIG. 5 is a flowchart showing an exemplary object information updating processing;

FIG. 6 is a flowchart showing area-in notifying processing;

FIG. 7 is a flowchart showing area-out notifying processing;

FIG. 8 is a block diagram showing the structure of a projector 200;

FIG. 9 is a flowchart showing area-in notification responding processing;

FIG. 10 is a flowchart showing area-out notification responding processing;

FIG. 11 is a flowchart showing projector control processing;

FIG. 12 is a block diagram showing the structure of a mobile terminal 140;

FIG. 13 is a flowchart showing positional information notifying processing;

FIG. 14 is a flowchart showing service cooperating processing; and

FIG. 15 is a flowchart showing projector display data transmitting processing.

DETAILED DESCRIPTION OF PREFERRED EMBODIMENTS

An embodiment of the present invention will be further illustrated with the drawings below. FIGS. 1 to 15 are exemplary diagrams showing the display control system, the display service providing system, the display control program, and the display control method of the present invention.

According to the embodiment of the present invention, referring to FIG. 1, in the display control system, the display service providing system, the display control program, and the display control method, a spherical virtual object A is arranged and set at an area surrounding a projector 200, and virtual objects B and C are arranged and set at areas surrounding a mobile terminal 140 and a card 160 for the use of the presenter in the meeting place for presentation. When the virtual objects A and B are overlapped or the virtual objects A and C are overlapped, the projector 200 starts a projecting service based on the projector display data.

First, a description is given of the structure of a network system of the present invention with reference to FIG. 1. FIG. 1 is a diagram showing the structure of the network system of the present invention. Referring to FIG. 1, a virtual object management device 100 for managing the virtual objects, a card management device 180 for managing the card 160, and a service cooperation management device 240 for managing the cooperation of the services between devices are arranged to a wall in the meeting place for presentation.

The projector 200 used for the presentation and a printer 220 for printing a material for the presentation, are arranged in the meeting place for the presentation. Further, a mobile terminal 140 such as a PDA (Personal Digital Assistant) used by the presenter and the card 160, are arranged in the meeting place for the presentation. The mobile terminal 140 and the card management device 180 store the projector display data which is projected by the projector 200 as the material for the presentation. The projector display data includes one or plural page data having display contents segmented by page unit.

It is communicable by radio among the virtual object management device 100, the mobile terminal 140, the card 160, the card management device 180, the projector 200, the printer 220, and the service cooperation management device 240. Specifically, the virtual object management device 100 can communicate data with the mobile terminal 140, the card 160, the card management device 180, the projector 200, the printer 220, and the service cooperation management device 240. The mobile terminal 140 communicates data with the virtual object management device 100, the projector 200, the printer 220, and the service management device 240. The card 160 can communicate data with the virtual object management device 100. The card management device 180 communicates data with the virtual object management device 100, the projector 200, the printer 220, and the service cooperation management device 240. The projector 200 and the printer 220 communicate data with the virtual object management device 100, the mobile terminal 140, the card management device 180, and the service cooperation management device 240.

The spherical virtual object A is set to the area surrounding the projector 200, and the spherical virtual object B is set to the area surrounding the mobile terminal 140. The spherical virtual object C is set to the area surrounding the card 160. A spherical virtual object D is set to an area surrounding the printer 220. These virtual objects A to D are logical areas which are managed by the virtual object management device 100.

The service cooperation management device 240 has a storing device for storing object data for communication to establish the communication with the mobile terminal 140, the card management device 180, the projector 200, and the printer 220, and reads and transmits the object data for communication from the storing device in response to the request from the devices. The storing device stores object data A for communication for establishing the communication with the projector 200, object data B for communication for establishing the communication with the mobile terminal 140, object data C for communication for establishing the communication with the printer 220, and object data D for communication for establishing the communication with the card management device 180. For example, when the mobile terminal 140 communicates data with the projector 200, the mobile terminal 140 obtains the object data A for communication from the service cooperation management device 240 and executes processing for establishing the communication based on the obtained object data A for communication, thereby establishing the communication with the projector 200. That is, the object data A to D for communication has a driver function for establishing the communication with a specified partner device.

Next, a detailed description is given of the structure of the virtual object management device 100 with reference to FIG. 2. FIG. 2 is an exemplary block diagram showing the structure of the virtual object management device 100.

Referring to FIG. 2, the virtual object management device 100 can include a CPU 30 for controlling the calculation and the entire system based on a control program, a ROM 32 for previously storing a control program and the like of the CPU 30 at a predetermined area, a RAM 34 for storing the calculation result necessary for a calculation step of the CPU 30 and the data read from the ROM 32 or the like, and an I/F 38 for intermediating an input and an output of the data to an external device. The above-mentioned components are connected via a bus 39 as a signal line for transferring the data to receive and transmit the data.

Connected to the I/F 38 are a radio communication device 40 for radio communication with, as external devices, the mobile terminal 140, the card 160, the card management device 180, the projector 200, the printer 220, and the service cooperation management device 240, a virtual object management database (hereinafter, abbreviated to a DB as the database) 42 for registering and managing the object information on the virtual object, and a display device 44 for displaying an image on a screen based on an image signal.

Referring to FIG. 3, the virtual object management DB 42 stores a virtual object management table 400 for registering object information on the shape and the arrangement position of the virtual object corresponding to service information which prescribes service contents. FIG. 3 is an exemplary diagram showing the structure of data of the virtual object management table 400.

Referring to FIG. 3, the virtual object management table 400 can register one record every virtual object. The record contains a field 402 for registering series No., a field 404 for registering the type of services using the devices such as the projector 200, a field 406 for registering a service ID for specifying the service, a field 408 for registering coordinates indicating the arrangement position of the virtual object on virtual space corresponding to real space, a field 410 for registering the shape of the virtual object, a field 412 for registering the size of the virtual object, and a field 414 for registering area-in management information for managing the cooperation of the services. Herein, data in the fields 404 and 406 correspond to the service information and data in the fields 408 to 412 correspond to the object information.

In the example shown in FIG. 3, the record at the first step registers "1" as the series No. in the field 402, "projector service" as the type of services in the field 404, "0001" as the service ID in the field 406, "(10, 50, 20)" as the coordinates in the field 408, "spherical" as the shape in the field 410, and "2(m)" as the size in the field 412. This means that the virtual object A is virtually arranged with the spherical shape of a radius of 2(m) from the coordinates (10, 50, 20) as center in real space at which the projector 200 is arranged and the projector 200 provides the projecting service in the area of the virtual project A specified by the arrangement and the shape.

The record at the second step registers "2" as the series No. in the field 402, "PDA service" as the type of services in the field 404, "0002" as the service ID in the field 406, "(30, 40, 20)" as the coordinates in the field 408, "spherical" as the shape in the field 410, and "1(m)" as the size in the field 412. This means that the virtual object B is virtually arranged with the spherical shape of a radius of 1(m) from the coordinates (30, 40, 20) as center in real space in which the mobile terminal 140 exists and that the mobile terminal 140 provides the services within the virtual object B specified by the arrangement position and the shape. However, since the coordinates in real space in which the mobile terminal 140 exists changes every moment, the positional information is obtained from the mobile terminal 140 and the coordinates in the field 408 are updated based on the obtained positional information in the case of using the PDA service. For example, when the area of the virtual object A is overlapped with the area of the virtual object B, the projector service is cooperated with the PDA service and the projector 200 and the mobile terminal 140 can mutually be used.

Referring to FIG. 4, the virtual object management DB 42 stores a communication information registering table 500 for registering communication information which specifies the object data for communication to be obtained from the service cooperation management device 240 every service in the case of using the service. FIG. 4 is a diagram showing the data structure of the communication information registering table 500.

Referring to FIG. 4, the communication information registering table 500 registers one record every service. Each record contains a field 502 which records the service ID, a field 504 which registers the type of services, and a field 506 which registers the communication information. The communication information registering table 500 is stored in the virtual object management device 100, the mobile terminal 140, the card management device 180, the projector 200, the printer 220, and a storing device of the service cooperation management device 240.

In the example in FIG. 4, the first record registers "0001" as the service ID in the field 502, "projector service" as the type of services in the field 504, and "object data A for communication" as the communication information in the field 506. This means that the object data A for communication must be obtained from the service cooperation management device 240 upon using the projector service.

The CPU 30 can include a micro processing unit (MPU) and the like. The CPU 30 starts a predetermined program stored in a predetermined area of the ROM 32, and executes by time division, object information updating processing, area-in notifying processing, and area-out notifying processing shown in the flowcharts in FIGS. 5 to 7 in accordance with the program.

First, the object information updating processing will be described in detail with reference to FIG. 5. FIG. 5 is a flowchart showing an exemplary object information updating processing.

In the object information updating processing, the arrangement position of the virtual object B is updated based on the positional information from the mobile terminal 140. Referring to FIG. 5, the object information updating processing is executed by the CPU 30, and then the processing routine advances to step S404.

In step S404, it is determined whether or not the positional information is received. If it is determined that the positional information is received (Yes), the processing routine advances to step S406. However, if not so (No), the CPU 30 waits in step S404 until the positional information is received.

In step S406, in the case of using the PDA service, coordinates of the field 408 in the virtual object management table 400 are updated based on the received positional information. In step S408, the response indicating that the reception of the positional information is notified to the mobile terminal 140, a series of processing ends, and the processing routine returns to the original processing.

In the object information updating processing shown in FIG. 5, the arrangement position of the virtual object B corresponding to the mobile terminal 140 is updated. In the case of the virtual object C corresponding to the card 160, the above-mentioned processing is executed. In this case, processing for the mobile terminal 140 in steps S404 to S408 is replaced with processing for the card 160.

Next, the area-in notifying processing will be described in detail with reference to FIG. 6. FIG. 6 is a flowchart showing an exemplary area-in notifying processing. In the area-in notifying processing, a fact that the area of one virtual object is overlapped with the area of another virtual object is notified to each of the devices. The CPU 30 executes the area-in notifying processing and, referring to FIG. 6, the processing routine advances to step S500.

In step S500, the record of the PDA service (hereinafter, referred to as object information and service information of the mobile terminal 140 in the processing) is read from the virtual object management table 400. Then, the processing routine advances to step S502 whereupon a record at the head (hereinafter, referred to object information and service information of the target device in the processing) is read from the virtual object management table 400, and the processing routine advances to step S504.

In step S504, it is determined, based on the object information of the mobile terminal 140 and the object information of the target device, whether or not the area specified by the shape and the arrangement position of the virtual object B is overlapped to the area specified by the shape and the arrangement position of the virtual object corresponding to the target device. If it is determined that the areas are overlapped (hereinafter, referred to area-in) (Yes), the processing routine advances to step S554.

In step S554, an E-mail indicating that an operation right of the target device can be set is formed and the processing routine advances to step S556 whereupon an E-mail address of the virtual object management device 100 is attached to the formed E-mail. In step S558, the communication information of the PDA service is read from the communication information registering table 500, and the object data B for communication is obtained from the service cooperation management device 240 based on the read communication information. In step S560, the communication with the mobile terminal 140 is established by executing the communication establishing processing based on the obtained object data B for communication. Then, the E-mail formed in steps S554 and S556 is transmitted to the mobile terminal 140 by an E-mail as a communication system and the processing routine advances to step S562.

In step S562, it is determined whether or not an E-mail in response to the E-mail transmitted in step S560 is received. If it is determined that the response E-mail is received (Yes), the processing routine advances to step S564 whereupon the operation right of the target device is set and the processing routine advances to step S506. On the other hand, if it is determined in step S562 (No) that the response E-mail is not received, the CPU 30 waits in step S562 until the response E-mail is received.

In step S506, the communication information is read from the communication information registering table 500 based on the service information of the target information and the object data for communication of the corresponding service is obtained from the service cooperation management device 240 based on the read communication information. In step S508, the communication with the target device is established by executing the communication establishing processing based on the obtained object data for communication. Then, the area-in is notified to the target device and the processing routine advances to step S540.

In step S540, it is determined whether or not the response for the notification of the area-in is received. If it is determined that the response is received (Yes), the processing routine advances to step S542. If it is determined that the response is not received (No), the CPU 30 waits in step S540 until the response is received.

In step S542, the service ID of the corresponding service is registered in the area-in management information of the PDA service and the processing routine advances to step S544 whereupon the processing in steps S504 to S542 ends for all the services which are registered in the virtual object management table 400. If it is determined that the processing ends (Yes), a series of processing ends the processing routine returns to the original processing.

If it is determined in step S544 that the processing in steps S504 to 542 does not end for all the services (No), the processing routine advances to step S546 whereupon the next record is read from the virtual object management table 400. Then, the processing routine shifts to step S504.

If it is determined in step S504 that the apparatus is not in the area (No), the processing routine shifts to step S544.

In the area-in notifying processing shown in the flowchart of FIG. 6, the area-in of the PDA service is notified. The above-mentioned processing is executed in the case of the card service. In this case, the processing for the PDA service in steps S500 and S542 is replaced with the processing for the card service and the further the processing in steps S554 to S564 is not necessary.

Next, the area-out notifying processing will be described in detail with reference to FIG. 7. FIG. 7 is a flowchart showing an exemplary area-out notifying processing.

In the area-out notifying processing, a fact that the area of the one virtual object is not overlapped with the area of the other virtual object is notified to the devices. The CPU 30 executes the area-out notifying processing and, referring to FIG. 7, the processing routine advances to step S600.

In step S600, the record of the PDA service (hereinafter, referred to object information and service information of the mobile terminal 140 in the processing) is read from the virtual object management table 400, and the processing routine advances to step S602 whereupon the service ID at the head is read from the area-in management information of the PDA service. Then, in step S604, a record of the service of the read service ID (hereinafter, referred to object information and service information of the target device in the processing) is read from the virtual object management table 400 and the processing routine advances to step S606.

In step S606, it is determined, based on the object information of the mobile terminal 140 and the object information of the target device, whether or not the area specified by the shape and the arrangement position of the virtual object B is overlapped with the area specified by the shape and the arrangement position of the virtual object corresponding to the target device. If it is determined that the areas are not overlapped (hereinafter, referred to an area-out) (Yes), the processing routine advances to step S608.

In step S608, the communication information is read from the communication information registering table 500 based on the service information of the target device, and the object data for communication is obtained from the service cooperation management device 240 based on the read communication information. Then, in step S610, the communication establishing processing is executed based on the obtained object data for communication, thereby establishing the communication with the target device and notifying the area-out to the target device. The processing routine advances to step S626.

In step S626, it is determined whether or not the response for notifying the area-out is received. If it is determined that the response is received (Yes), the processing routine advances to step S628. If it is determined that the response is not received (No), the CPU 30 waits in step S626 until the response is received.

In step S628, the service ID of the corresponding service is deleted from the area-in management information of the PDA service. Then, in step S630, it is determined whether or not the processing in steps S604 to S628 ends for all the services registered in the area-in management information of the PDA service. If it is determined that the processing ends (Yes), a series of processing ends and the processing routine returns to the original processing.

In step S630, it is determined that the processing in steps S604 to S628 does not end for all the services (No), the processing routine advances to step S632 whereupon the next service ID is read from the area-in management information of the PDA service. Then, the processing routine shifts to step S604.

If the area-out is not determined in step S606 (No), the processing routine advances to step S630.

In the area-out notifying processing shown in the flowchart in FIG. 7, the area-out of the PDA service is notified. The above operation is executed in the case of the card service. In this case, the processing for the PDA service in steps S600 and S628 is replaced with the processing for the card service.

Next, the structure of the projector 200 will be described in detail with reference to FIG. 8. FIG. 8 is an exemplary block diagram showing the structure of the projector 200.

Referring to FIG. 8, the projector 200 can include a CPU 70 which controls the calculation and the entire system based on a control program, a ROM 72 which previously stores the control program of the CPU 70 in a predetermined area, a RAM 74 which stores data read from the ROM 72 or the like and the calculation result necessary for calculation processing of the CPU 70, and an I/F 78 which intermediates an input and an output of data to an external device. The above-mentioned components are connected by a bus 79 as a signal line for transferring the data to receive and transmit the data.

Connected to the I/F 78 are the radio communication device 80 which communicates data by radio with, as external devices, the virtual object management device 100, the mobile terminal 140, the card management device 180, and the service cooperation management device 240, and a projecting device 82 which projects an image on a screen based on an image signal.

The CPU 70 can include a micro processing unit (MPU) and the like. The CPU 70 starts a predetermined program stored in a predetermined area of the ROM 72, and executes by time division, area-in notification responding processing, area-out notification responding processing, and projector control processing shown in the flowcharts in FIGS. 9 to 11 in accordance with the program.

First, the area-in notification responding processing will be described in detail with reference to FIG. 9. FIG. 9 is a flowchart showing the area-in notification responding processing.

The area-in notification responding processing corresponds to the area-in notifying processing in FIG. 6. The CPU 70 executes the area-in notification responding processing and, referring to FIG. 9, the processing routine advances to step S510.

In step S510, it is determined whether or not the notification of the area-in is received. If it is determined that the notification of the area-in is received (Yes), the processing routine advances to step S512. However, if it is determined that the notification of the area-in is not received (No), the CPU 70 waits in step S510 until the notification of the area-in is received.

In step S512, it is determined whether or not the service of the received notification of the area-in is the PDA service. If it is determined that the service of the notification of the area-in is the PDA service (Yes), the processing routine advances to step S514 whereupon the communication information of the PDA service is read from the communication information registering table 500 and the object data B for communication is obtained from the service cooperation management device 240 based on the read communication information. Then, in step S516, the communication with the mobile terminal 140 is established by executing the communication establishing processing based on the obtained object data B for communication, thereby transmitting the request for starting the service cooperation to the mobile terminal 140. In step S524, the request for transmitting the projector display data is transmitted to the mobile terminal 140 and the processing routine advances to step S566. Incidentally, the request for starting the cooperation in step S516 and the request for transmission in step S524 may be transmitted by an E-mail system as a communication system.

In step S566, it is determined whether or not the projector display data is received. If it is determined that the projector display data is received (Yes), the processing routine advances to step S568. If not so (No), the CPU 70 waits in step S566 until the projector display data is received.

In step S568, the page data corresponding to the last page among the page data included in the projector display data is obtained from the projector display data. Then, the processing routine shifts to step S570 whereupon the obtained page data is stored in the stack area of the RAM 74. Herein, the stack area is a part of the storing area of the RAM 74, and the head address is indicated by a pointer called a stack pointer.

Next, in step S572, "1 µl" is subtracted from the stack pointer 1 and then, in step S574, it is determined whether or not all the page data included in the projector display data is stored in the stack area. If it is determined that all the page data is stored in the stack area (Yes), the processing routine shifts to step S538 whereupon the response indicating the notification of the area-in is received is notified to the virtual object management device 100. Then, a series of processing ends and the processing routine returns to the original processing.

If it is determined in step S574 that all the page data included in the projector display data is not stored in the stack area (No), the processing routine advances to in step S576 whereupon the page data corresponding to the one-prior page among the page data included in the projector display data is obtained from the projector display data. Then, the processing routine shifts to step S570.

If it is determined in step S512 that the service of the received notification of the area-in is not the PDA service (No), in step S548, the communication information of the service is read from the communication information registering table 500 and the object data for communication of the service is obtained from the service cooperation management device 240 based on the read communication information. In step S550, the communication establishing processing is executed based on the obtained object data for communication, thereby transmitting the request for starting the service cooperation to the target device of the corresponding service. In step S552, processing for cooperation of the services is executed and the processing routine shifts to step S538.

Although the area-in of the PDA service is mainly is notified in the area-in notification responding processing shown in the flowchart of FIG. 9, the above-mentioned processing is executed in the case of the card service. In this case, in steps S512 and S514, the processing for the PDA service is replaced with the processing for the card service.

Next, a detailed description is given of the area-out notification responding processing with reference to FIG. 10. FIG. 10 is a flowchart showing an exemplary area-out notification responding processing.

The area-out notification responding processing corresponds to the area-out notifying processing in FIG. 7. The CPU 70 executes the area-out notification responding processing and, referring to FIG. 10, the processing routine first shifts to step S612.

In step S612, it is determined whether or not the notification of the area-out is received. If it is determined that the notification of the area-out is received (Yes), the processing routine advances to step S614. However, if it is determined that the notification of the area-out is not received (No), the CPU 70 waits in step S612 until the notification of the area-out is received.

In step S614, it is determined whether or not the service of the notification of the received area-out is the PDA service. If it is determined that the service is the PDA service of notification of the area-out (Yes), the processing routine advances to step S616 whereupon the communication information of the PDA service is read from the communication information registering table 500 and the object data B for communication is obtained from the service cooperation management device 240 based on the read communication information. In step S618, the communication with the mobile terminal 140 is established by executing the communication establishing processing based on the obtained object data B for communication and a request for ending the cooperation of the services is transmitted to the mobile terminal 140. In step S624, a response indicating that the notification of the area-out is received is transmitted to the virtual object management device 100. Then, a series of the processing ends and the processing routine returns to the original processing.

If it is determined in step S614 that the service of the notification of the received area-out is not the PDA service (No), the processing routine shifts to step S634 whereupon the communication information of the corresponding service is read from the communication information registering table 500, and the object data for communication of the corresponding service is obtained from the service cooperation management device 240 based on the read communication information. In step S636, the communication with the target device of the service is established by executing the communication establishing processing based on the obtained object data for communication, and the request for ending the cooperation of the services is transmitted to the target device of the corresponding service. Then, the processing routine shifts to step S624.

Mainly in the case of notifying the area-out of the PDA service, the area-out notification responding processing shown in the flowchart of FIG. 10 is performed. However, the above-mentioned processing is executed in the case of the card service. In this case, the processing for the PDA service in steps S614 and S616 is replaced with the processing for the card service.

Next, a detailed description is given of the projector control processing with reference to FIG. 11. FIG. 11 is a flowchart showing an exemplary projector control processing.

In the projector control processing, the projector 200 is controlled in accordance with the operation contents of the mobile terminal 140. The CPU 70 executes the projector control processing and, thereby, the processing routine shifts to step S700 as shown in FIG. 11.

In step S700, it is determined whether or not the page data is stored in the stack area. If it is determined that the page data is stored in the stack area (Yes), the processing routine advances to step S702, whereupon it is determined whether or not the E-mail is received from the mobile terminal 140. If it is determined that the E-mail is received (Yes), the processing routine advances to step S704.

In step S704, an operation instruction is obtained from indexes for which a subject is described, from the data forming the received E-mail. In step S706, it is determined that the obtained operation instruction is an instruction "NEXT" indicating the presentation during projection advances to one page. If it is determined that the operation instruction indicates "NEXT" (Yes), the processing routine advances to step S708 whereupon one is added to the stack pointer. Then, in step S710, the page data is read from the head of the stack area. In step S712, the projecting device 82 projects the page based on the read page data, a series of processing ends, and the processing routine returns to the original processing.

If it is determined in step S706 that the obtained instruction is not "NEXT" (No), the processing routine shifts to step S714 whereupon it is determined whether or not the obtained operation instruction is an instruction "PRIOR" indicating that the presentation during projection returns to one page. If it is determined that the operation instruction is the instruction "PRIOR" (Yes), the processing routine shifts to step S716 whereupon it is determined whether or not the currently displayed page is a head page. If it is determined that the page is not the head page (No), the processing routine advances to step S718.

In step S718, one is subtracted from the stack pointer. In step S720, the page data is read from the head of the stack area and, in step S722, the projecting device 82 projects the page based on the read page data. Then, a series of processing ends and the original processing returns to the original processing.

If it is determined in step S716 that the currently displayed page is the head page (Yes), and if it is determined in step S714 that the obtained operation instruction is not the instruction "PRIOR" (No), a series of processing ends and the processing routine returns to the original processing.

If it is determined in step S702 that the E-mail is not received from the mobile terminal 140 (No) and if it is determined in step S700 that the page data is not stored in the stack area (No), the processing routine shifts to step S700.

Next, the structure of the printer 220 will be described in detail. The printer 220 has substantially the same functions as those of the projector 200. Unlike the projector 200, the printer 220 can include a printing device in place of the projecting device 82. A CPU of the printer 220 executes processing corresponding to the area-in notification responding processing and the area-out notification responding processing shown in FIGS. 9 and 10. In this case, in place of the processing in steps S568 to S574, the CPU of the printer 220 executes processing for printing data by the printing device based on the received projector display data.

Next, the structure of the mobile terminal 140 will be described in detail with reference to FIG. 12. FIG. 12 is an exemplary block diagram showing the structure of the mobile terminal 140.

Referring to FIG. 12, the mobile terminal 140 can include a CPU 90 which controls the calculation and the entire system based on a control program, a ROM 92 which previously stores the control program of the CPU 90 and the like in a predetermined area, a RAM 94 which stores the data read from the ROM 92 or the like and the calculation result necessary for the calculation step of the CPU 90, and an I/F 98 which intermediates an input and an output of data to an external device. The above-mentioned components are connected by a bus 99 as a signal line for transferring data to receive and transmit the data.

Connected to the I/F 98 are the radio communication device 83 which performs radio communication with, as external devices, the virtual object management device 100, the projector 200, the printer 220, and the service cooperation management device 240, a key panel 84 which can input data by a plurality of keys as a human interface, an LCD (Liquid Crystal Display) 85 which displays a screen based on an image signal, and the positional information obtaining device 86 which obtains the positional information for measuring the current position of the mobile terminal 140 and specifying the position.

The positional information obtaining device 86 receives a time signal from a rounding satellite for transmitting the time signal indicating the current time, measures the current position by using a so-called GPS for measuring the position based on a rounding orbit of the rounding satellite and the time indicated by the time signal, and outputs the measured current position as the positional information.

The CPU 90 can include a micro processing unit (MPU) and the like. The CPU 90 starts a predetermined program stored in an predetermined area of the ROM 92, and executes by time division positional information notifying processing, service cooperation processing, and projector display data transmitting processing shown in flowcharts in FIGS. 13 to 15 in accordance with the program.

First, the positional information notifying processing will be described in detail with reference to FIG. 13. FIG. 13 is a flowchart showing an exemplary positional information notifying processing.

The positional information notifying processing corresponds to the object information updating processing shown in FIG. 5. The CPU 90 executes the positional information notifying processing and, referring to FIG. 13, the processing routine shifts to step S400.

In step S400, the positional information is obtained from the positional information obtaining device 86. In step S402, the obtained positional information is transmitted to the virtual object management device 100 and the processing routine advances to step S410.

In step S410, it is determined whether or not the response to the transmission of the positional information is received. If it is determined that the positional information is received (Yes), a series of processing ends and the processing routine returns to the original processing. If it is determined that the response is not received (No), the CPU 90 waits in step S410 until the response is received.

Next, the service cooperation processing will be described in detail with reference to FIG. 14. FIG. 14 is a flowchart showing the exemplary service cooperation processing.

The service cooperation processing corresponds to the area-in notification responding processing and the area-out notification responding processing shown in FIGS. 9 and 10. The CPU 90 executes the service cooperation processing and, referring to FIG. 14, the processing routine shifts to step S518.

In step S518, it is determined whether or not a request for starting the service cooperation is received. If it is determined that the request for starting the service cooperation is received (Yes), the processing routine shifts to step S520. In step S520, the communication information of the service is read from the communication information registering table 500 and the object data for communication of the service is obtained from the service cooperation management device 240 based on the read communication information. In step S522, the communication establishing processing is executed based on the obtained object data for communication. Then, the communication with the target device of the corresponding service is established by executing the communication establishing processing based on the obtained object data for communication and the cooperation of the services is started. Then, a series of processing ends and the processing routine returns to the original processing.

If it is determined in step S518 that the request for starting the cooperation of the services is not received (No), the processing routine shifts to step S620, whereupon it is determined whether or not the request for ending the cooperation of the services is received. If it is determined that the request for ending the cooperation of the services is received (Yes), the processing routine shifts to step S622. In step S622, the cooperation of the services of the received request for ending the cooperation of the service ends, a series of processing ends, and the processing routine returns to the original processing.

If it is determined in step S620 that the request for ending the cooperation of the service is not received (No), the processing routine shifts to step S518.

Next, the projector display data transmitting processing will be described in detail with reference to FIG. 15. FIG. 15 is a flowchart showing an exemplary projector display data transmitting processing.

The projector display data transmitting processing corresponds to the area-in notification responding processing shown in FIG. 9. The CPU 90 executes the projector display data transmitting processing and, referring to FIG. 15, the processing routine shifts to step S526.

In step S526, it is determined whether or not the services are currently cooperated. If it is determined that the services are currently cooperated (Yes), the processing routine advances to step S528. If not so (No), the CPU 90 waits in step S526.

In step S528, it is determined whether or not the request for transmitting the projector display data is received. If it is determined that the request for transmission is received (Yes), the processing routine advances to step S530. If not so (No), the CPU 90 waits in step S528 until the request for the transmission is received.

In step S530, the projector display data is read from the RAM 94 or the like. In step S532, the read projector display data is transmitted to the target device of the corresponding service, a series of processing ends, and the processing routine returns to the original processing.

Next, the structure of the card 160 will be described in detail.

The card 160 can include a radio communication device for radio communication with the virtual management device 100, and the positional information obtaining device for obtaining the positional information which measures the current position of the card 160 and specifies the position (which are not shown). The radio communication device transmits the positional information obtained by the positional information obtaining device to the virtual object management device 100 at a predetermined period. Specifically, the radio communication device performs the operation corresponding to the positional information notifying processing shown in the flowchart of FIG. 13 among processing executed by the mobile terminal 140.

A circuit for connecting a coil to a capacitor can be provided in the card 160. Further, the coil receives electromagnetic waves from an electromagnetic wave irradiating device (not shown) provided in the meeting place for presentation, and the capacitor charges power converted by electromagnetic induction. The charged power is fed to the radio communication device and the positional information obtaining device, thereby driving them.

Next, the structure of the card management device 180 will be described in detail. The card management device 180 has the same functions as those of a general computer which connects a CPU, a ROM, a RAM, an I/F, and the like by a bus. A storing device of the card management device 180 stores the projector display data of the presenters.

The CPU of the card management device 180 can include a micro processing unit (MPU) and the like. The CPU starts a predetermined program stored in an predetermined area of the ROM, and executes by time division processing corresponding to the service cooperation processing and the projector display data transmitting processing shown in flowcharts in FIGS. 14 to 15 among processing executed by the mobile terminal 140 in accordance with the program.

Next, the operation will be described according to the embodiment.

To perform the presentation by the presenter, first, the basic projector display data for the presentation is stored in the mobile terminal 140, and the projector display data is stored in the card management device 180 so as to display the change of the presentation contents due to the audience's reaction upon presentation. When the presenter carries the mobile terminal 140 and the card 160 and moves in the meeting place for the presentation, the mobile terminal 140 passes through the processing in steps S400 and S402, whereupon the positional information is obtained from the positional information obtaining device 86, and the obtained positional information is transmitted to the virtual object management device 100. The card 160 passes through processing in steps S400 and S402 whereupon the positional information is obtained from the positional information obtaining device and the obtained positional information is transmitted to the virtual object management device 100.

The virtual object management device 100 receives the positional information from the mobile terminal 140 and passes through processing in steps S406 and S408, whereupon the coordinates of the field 408 of the PDA service in the virtual object management table 400 are updated based on the received positional information, and a response indicating the reception of the positional information is notified to the mobile terminal 140. The virtual object management device 100 receives the positional information from the card 160 and passes through steps S406 and S408, whereupon coordinates of the field 408 of the card service in the virtual object management table 400 are updated based on the received positional information, and a response indicating the reception of the positional information is notified to the card 160.

The mobile terminal 140 receives the response to the transmission of the positional information and then repeatedly transmits the positional information at a predetermined time (e.g., three seconds). The card 160 receives the response to the transmission of the positional information and then repeatedly transmits the positional information at a predetermined time (e.g., three seconds). Thus, the arrangement positions of the virtual objects B and C are updated in accordance with the movement of the mobile terminal 140 and the card 160, respectively.

Next, when the presenter performs the presentation, the virtual objects A to D are set, and the mobile terminal 140 is simultaneously close to the projector 200. Thus, when virtual object B enters the area of the virtual object A, the virtual object management device 100 passes through processing in steps S500 to S504, S554, and S556, whereupon an E-mail indicating that the operation right of the projector 200 can be set is formed and an E-mail address of the virtual object management device 100 is attached to the formed E-mail. Next, in step S558, the communication information of the PDA service is read from the communication information registering table 500, and the object data B for communication is obtained from the service cooperation management device 240 based on the read communication information. In step S560, the communication with the mobile terminal 140 is established by executing the communication establishing processing based on the obtained object data B for communication. The E-mail formed in steps S554 and S556 is transmitted to the mobile terminal 140 by the E-mail system as one communication system.

The mobile terminal 140 receives the E-mail indicating that the operation right of the projector 200 can be set, and then the presenter clicks the E-mail address as a response destination attached to the received E-mail. Thus, the response E-mail to the above E-mail is transmitted to the virtual object management device 100 by the E-mail system as one communication system.

The virtual object management device 100 receives the response E-mail and passes through processing in steps S562 and S564 whereupon the operation right of the projector 200 is set. Subsequently, in step S506, the communication information is read from the communication information registering table 500 based on the service information of the projector 200 and the object data A for communication is obtained from the service cooperation management device 240 based on the read communication information. In step S508, the communication with the projector 200 is established by executing the communication establishing processing based on the obtained object data A for communication, and the area-in is notified to the projector 200.

The projector 200 receives the notification indicating the area-in. The service of the notification indicating the area-in is the PDA service, and therefore, the projector 200 passes through processing in steps S512 and S514, whereupon the communication information of the PDA service is read from the communication information registering table 500, and the object data B for communication is obtained from the service cooperation management device 240 based on the read communication information. Subsequently, in steps S516 and S524, the communication with the mobile terminal 140 is established by executing the communication establishing processing based on the obtained object data B for communication and both the request for starting the cooperation of the services and the request for transmitting the projector display data are transmitted to the mobile terminal 140 by the E-mail system as one communication system.

The mobile terminal 140 receives the request for starting the cooperation of the services. Since the service of the received request for starting the cooperation of the services is the projector service, the mobile terminal 140 passes through processing in step S520, whereupon the communication information of the projector service is read from the communication information registering table 500, and the object data A for communication is obtained from the service cooperation management device 240 based on the read communication information. In step S522, the communication with the projector 200 is established by executing the communication establishing processing based on the obtained object data A for communication, and the cooperation with the projector service is started. When the cooperation with the projector service is performed and the request for transmitting the projector display data is simultaneously received, the mobile terminal 140 passes through processing in steps S530 and S532, whereupon the projector display data designated as data for the presentation is read and the read projector display data is transmitted to the projector 200.

The projector display data is received, and then the projector 200 passes through steps S566 to S574, and S538, whereupon the page data included in the received projector display data is stored in the stack area by the stack system in which the page data corresponding to the last page is at the head, and the response indicating the notification of the area-in is notified to the virtual object management device 100.

Next, when the presenter desires that the page of the presentation advance to one next page, he forms an E-mail which describes an operation instruction "NEXT" in the index for describing a subject and transmits the formed E-mail to the projector 200.

The E-mail is received and then the projector 200 passes through processing in steps S700 to S704, whereupon the operation instruction is obtained from the index for subscribing the subject among the data forming the received E-mail, and the obtained operation instruction is "NEXT". Then, in steps S706 to S712, one is added to the stack pointer, the page data is read from the head of the stack area, and the projecting device 82 projects the page based on the read page data. That is, the presentation during projection advances to one next page.

When the presenter desires that the presentation during projecting the presentation returns to one prior page, he forms an E-mail for describing an operation instruction "PRIOR" in the index for describing the subject and transmits the formed E-mail to the projector 200.

The E-mail is received, and then the projector 200 passes through processing in steps S700 to S704, whereupon the operation instruction is obtained from the index for describing the subject among the data forming the received E-mail, and the obtained operation instruction is "PRIOR". Then, in steps S714 to S722, one is subtracted from the stack pointer, the page data is read from the head of the stack area, and the projecting device 82 projects the page based on the read page data. That is, the presentation during projection returns to one prior page. However, when the current display page is at the head, the page are not changed by receiving the operation instruction "PRIOR".

The response to the notification of the area-in is received, and then the virtual object management device 100 passes through step S542, whereupon the service ID of the projector service is registered in the area-in management information of the PDA service, and the cooperation between the PDA service and the projector service is managed.

Next, when the presenter changes the presentation contents to contents suitable to the audience's reaction, the card 160 is close to the projector 200 so as to display the projector display data for change which is stored in the card management device 180. Thus, when the virtual object C is in the area of the virtual object A, the virtual object management device 100 passes through processing in steps S500 to S506 whereupon the communication information is read from the communication information registering table 500 based on the service information of the projector 200, and the object data A for communication is obtained from the service cooperation management device 240 based on the read communication information. Subsequently, in step S508, the communication with the projector 200 is established by executing the communication establishing processing based on the obtained object data A for communication, and the area-in is notified to the projector 200.

The notification of the area-in is received, then, the service of the notification of the area-in is the card service, and therefore, the projector 200 passes through processing in steps S512 and S514 whereupon the communication information of the card service is read from the communication information registering table 500, and the object data D for communication is obtained from the service cooperation management device 240 based on the read communication information. Subsequently, in steps S516 and S524, the communication with the card management device 180 is established by executing the communication establishing processing based on the obtained object data D for communication, and the request for starting the cooperation of the services is transmitted to the card management device 180, and the request for transmitting the projector display data is transmitted to the card management device 180.

The request for starting the cooperation of the services is received, then, the service of the request for starting the cooperation of the services is the projector service, and therefore, the card management device 180 passes through processing in step S520 whereupon the communication information of the projector service is read from the communication information registering table 500, and the object data A for communication is obtained from the service cooperation management device 240 based on the read communication information. Next, in step S522, the communication with the projector 200 is established by executing the communication establishing processing based on the obtained object data A for communication, and the cooperation with the projector service is started. The request for transmitting the projector display data is received during the cooperation with the projector service, and then the card management device 180 passes through processing in steps S530 and S532 whereupon the projector display data designated as data for presentation is read, and the read projector display data is transmitted to the projector 200.

The projector 200 receives the projector display data. Then, in steps S566 to S574, and S538, the page data included in the received projector display data is stored in the stack area by the stack system in which the page data corresponding to the last page is at the head, and the response indicating that the notification of the area-in is received is notified to the virtual object management device 100.

The virtual object management device 100 receives the response to the notification of the area-in. In step S542, the service ID of the projector service is registered to the area-in management information of the card service, and the cooperation between the card service and the projector service is managed.

Next, the card 160 is away from the projector 200 so that the presenter ends the presentation of the changed presentation contents, and the processing returns to the original presentation. Thus, when the virtual object C is out of the area of the virtual object A, the virtual object management device 100 passes through steps S600 to S608, whereupon the communication information is read from the communication information registering table 500 based on the service information of the projector 200, and the object data A for communication is obtained from the service cooperation management device 240 based on the read communication information. Subsequently, in step S610, the communication with the projector 200 is established by executing the communication establishing processing based on the obtained object data A for communication, and the area-out is notified to the projector 200.

The projector 200 receives the notification of the area-out, and then the service of the area-out notification is the card service. Thus, the processing routine advances to steps S614 and S616, whereupon the communication information of the card service is read from the communication information registering table 500, and the object data B for communication is obtained from the service cooperation management device 240 based on the read communication information. In steps S618 and S624, the communication with the card management device 180 is established by executing the communication establishing processing based on the obtained object data D for communication. The request for ending the cooperation of the services is transmitted to the card management device 180, and the response indicating the reception of the area-out notification is transmitted to the virtual object management device 100.

The card management device 180 receives the request for ending the cooperation of the services, and then the service of the request for ending the cooperation of the services is the projector service. Thus, in step S622, the cooperation with the projector service ends.

The virtual object management device 100 receives the response to the area-out notification. Then, in step S628, the service ID of the projector service is deleted from the area-in management information of the card service, and the end of the cooperation between the card service and the projector service is managed.

As mentioned above, all the pages of the projector display data for change are completely displayed, the stack area stacks the page data of non-display page data among the original projector display data. Therefore, the non-display portion of the original projector display data can continuously be displayed without any operation after changing and display operation.

For example, when the presenter desires that an X-page is inserted and displayed between second and third pages of the basic projector display data due to the audience's reaction, the projector display data including the page data of the X-page may be stored in the card management device 180. Further, the card 160 may be close to the projector 200 during displaying the second page to display the X-page. After ending the display operation of the X-page, the third page is displayed without any operation.

When the presenter ends the entire presentation, he carries the mobile terminal 140 and is far away from the projector 200. Thus, the virtual object B is out of the virtual object A, and then the virtual object management device 100 is subjected to processing in steps S600 to S608, whereupon the communication information is read from the communication information registering table 500 based on the service information of the projector 200, and the object data A for communication is obtained from the service cooperation management device 240 based on the read communication information. In step S610, the communication with the projector 200 is established by executing the communication establishing processing based on the obtained object data A for communication, and the area-out is notified to the projector 200.

The projector 200 receives the area-out notification, and then the service of the area-out notification is the PDA service. Thus, in steps S614 and S616, the communication information of the PDA service is read from the communication information registering table 500, and the object data B for communication is obtained from the service cooperation management device 240 based on the read communication information. In steps S618 and S624, the communication with the mobile terminal 140 is established by executing the communication establishing processing based on the obtained object data B for communication. The request for ending the cooperation of the services is transmitted to the mobile terminal 140 by the E-mail system as one communication system, and the response of the reception of the area-out notification is transmitted to the virtual object management device 100.

The mobile terminal 140 receives the request for ending the cooperation of the services, and the service of the received request for ending the cooperation of the services is the projector service. Then, in step S622, the cooperation with the projector service ends.

The virtual object management device 100 receives the response to the area-out notification. Then, in step S628, the service ID of the projector service is deleted from the area-in management information of the PDA service, and the end of the cooperation between the PDA service and the projector service is managed.

As mentioned above, the mobile terminal 140 and the card 160 are close to the projector 200, and the virtual objects B and C are in the area of the virtual object A. Thus, the projector display data of the mobile terminal 140 and the card management device 180 are projected by the projector 200. However, the mobile terminal 140 or the card 160 is close to the printer 200, and the virtual objects B and C are in the area of the virtual object D. Thus, when the projector display data of the mobile terminal 140 or the card management device 180 is printed by the printer 220, the above-operation can be applied.

As mentioned above, according to the embodiment, the projector 200 stores the page data included in the projector display data in the stack area by the stack system in which the page data corresponding to the last page is at the head. The projecting device 82 projects the page based on the page data read from the stack area. Another projector display data is transmitted during projection, the page data included in the other transmitted projector display data is additionally stored in the stack area by the stack system.

Consequently, when another projector display data different from that used for the current display operation is temporarily inserted and displayed, the non-display portion of the original display data can continuously be displayed without any operation after insertion and display operation. Easily, the presentation contents can dynamically be changed depending on the audience's reaction upon presentation. Therefore, as compared with the related arts, the flexible and smooth presentation can be performed.

According to the embodiment, the virtual object management device 100 registers the object information on the shape and the arrangement position of the virtual object A with a corresponding relationship with the projector 200, and registers the object information on the shape and the arrangement position of the virtual object B with a corresponding relationship with the mobile terminal 140, and updates the arrangement position of the virtual object B based on the received positional information. When it is determined that the virtual object B is in the area of the virtual object A by referring to the virtual object management table 400, the virtual object management device 100 transmits the area-in notification to the projector 200. When the area-in notification is received, the projector 200 transmits the request for transmitting the projector display data to the mobile terminal 140. As a result of the transmission, the projector display data is received, the projecting device 82 projects the data based on the received projector display data. The mobile terminal 140 transmits the positional information obtained by the positional information obtaining device 86 to the virtual object management device 100. On the other hand, when the request for transmitting the projector display data is received, the mobile terminal 140 transmits the projector display data to the projector 200.

Accordingly, the virtual objects A and B have the shapes and the arrangement positions, and it is determined whether or not the virtual object B is in the area of the virtual object A. As compared with the related arts, the area for providing the services is relatively clear. For example, varied services can be provided on fine unit such as several-meter unit. The area for providing the projecting service (the area of the virtual object A) and the area corresponding to the mobile terminal 140 (the area of the virtual object B) have not points but the predetermined range, and therefore, the presenter easily receives the projecting service. The presenter receives the projecting service only by carrying the mobile terminal 140 to the area of the virtual object A or adjacently thereto and, that is, the projecting service can be provided with relative ease. Further, the presenter can substantially be specified, thus providing the projecting service using the projector display data corresponding to the presenter.

In addition, according to the embodiment, when it is determined that the virtual object B is in the area of the virtual object A, the virtual object management device 100 transmits to the mobile terminal 140, an E-mail indicating that the operation right of the projector 200 can be set. When receiving a response E-mail corresponding the transmitted E-mail, the virtual object management device 100 sets the operation right of the projector 200. Thereafter, the projector 200 projects the data in accordance with the operation contents of the mobile terminal 140.

Thus, the mobile terminal 140 communicates data by a communication system with ease and small load. Preferably, the mobile terminal 140 can be used as a medium for detecting the movement of the presenter. The projector 200 outputs the data only by carrying the mobile terminal 140 to be close to the projector 200 by the presenter and by transmitting the response E-mail to the E-mail indicating the operation right can be set.

According to the embodiment, the projector 200 communicates the data with the mobile terminal 140 by the E-mail system as one communication system, and receives the operation contents of the mobile terminal 140. Then, the projector 200 projects the data in accordance with the received operation contents.

Thus, the mobile terminal 140 can communicate data with ease and small load and the mobile terminal 140 can preferably be used as a medium for detecting the movement of the presenter.

Further, according to the embodiment, the E-mail indicating that the operation right can be set includes the E-mail address of the virtual object management device 100 as the response destination. Thus, sufficiently, the presenter may transmit the response to the E-mail address included in the received E-mail. Accordingly, the projector 200 can easily be used.

Further, according to the embodiment, when the E-mail containing the operation instruction is received from the mobile terminal 140, the projector 200 obtains the operation instruction from the received E-mail and the projects the data in accordance with the obtained operation instruction. Thus, the projector 200 is operated only by describing the operation instruction to the E-mail and transmitting the it to the projector 200 by the presenter. Accordingly, the projector 200 can relatively easily be operated.

Furthermore, according to the embodiment, the projector 200 obtains the operation instruction from the index for describing the subject among the data forming the E-mail.

The projector can be operation only by describing the operation instruction to the index for describing the subject and transmitting the operation instruction to the projector 200 by the presenter. Thus, not only the projector 200 can further easily be operated but also the presenter can easily understand the operating method of the projector 200.

Moreover, according to the embodiment, when the area-in notification is received, the projector 200 obtains the object data B for communication from the service cooperation management device 240 and transmits the request for transmitting the projector display data by executing the communication establishing processing based on the obtained object data B for communication.

Consequently, when the projector 200 can access the service cooperation management device 240, it can provide the projecting service without the object data B for communication. The type and the number of the mobile terminal 140 and the like can be added. The projector 200 can relatively easily be added. When a plurality of the mobile terminals 140 exist, the object data for communication with the mobile terminal 140 can be singly managed.

Further, according to the embodiment, the virtual object management device 100 determines whether or not the virtual object B is in the area of the virtual object A by referring to the virtual object management table 400.

Thus, as compared with the case of using the mobile terminal 140, the processing load of the mobile terminal 140 can be reduced by the determination of the area-in in the virtual object management device 100. The above-mentioned operation is the same as that of the determination of the area-out.

Furthermore, according to the embodiment, the mobile terminal 140 stores the projector display data and transmits the projector display data. Thus, as compared with the case using the virtual object management device 100, the processing load of the virtual object management device 100 can be reduced by the transmission of the projector display data in the mobile terminal 140.

According to the embodiment, the projector 200 stores the page data included in the projector display data in the stack area by the stack system in which the page data corresponding to the last page is at the head, and the projecting device 82 projects the data based on the page data read from the stack area. When another projector display data is received during projection, the projector 200 additionally stores the page data included in the other received projector display data in the stack area by the stack system. However, it should be understood that the present invention is not limited to this, and another structure can be applied. In other words, when the other projector display data is received during the projection, the position of the page during display operation is stored as a return pointer among the present projector display data which is currently used for the display operation, and the display control operation based on the present projector display data suspends. Further, the display control operation is started based on the other received projector display data. When the display control operation suspends or ends based on the other received projector display data, the display control operation based on the present projector display data is returned from the page during the display operation based on the present projector display data and the stored return pointer. With the above-mentioned structure, the similar advances can be obtained.

According to the embodiment, the mobile terminal 140 uses the E-mail system as one communication system among the virtual object management device 100, the projector 200, and the printer 220. However, it should be understood the present invention is not limited to this and the mobile terminal 140 may use an HTTP (Hypertext Transfer Protocol). With the above-mentioned structure, the same advantages as those in the above description are obtained.

According to the embodiment, the virtual object management device 100 refers to the virtual object management table 400 and determines whether or not the virtual object B is in the area of the virtual object A. However, the present invention is not limited to this, and the virtual object management table 400 may be provided for the mobile device 140, and the mobile terminal 140 may determine whether or not the virtual object B is in the area of the virtual object A.

Consequently, the mobile terminal 140 can determine the area-in, and therefore, the processing load of the virtual object management device 100 can be reduced, as compared with the case of the determination of the area-in by the virtual object management device 100. Incidentally, the determination of the area-out is the same as that of the area-in.

Of course, it should be understood that the present invention is not limited to this, and the area-in may be determined by the projector 200, the printer 220, the service cooperation management device, or the like.

Further, according to the embodiment, the projector display data is transmitted by the mobile terminal 140. However, the present invention is not limited to this. The projector display data may be stored in the virtual object management device 100, and the projector display data may be transmitted by the virtual object management device 100. Thus, since the projector display data is transmitted by the virtual object management device 100, the processing load of the mobile terminal 140 can be reduced.

Of course, the present invention is not limited to this, and the projector display data may be transmitted by the projector 200, the printer 220, the service cooperation management device 240, or the like.

According to the embodiment, the virtual object management device 100 and the service cooperation management device 240 are individually provided. However, the present invention is not limited to this, and both the virtual object management device 100 and the service cooperation management device 240 may be integrated.

According to the embodiment, the object information and the service information are received and transmitted by radio. However, it should be understood that the present invention is not limited to this, and the object information and the service information may be received and transmitted via a network. Alternatively, the object information and the service information may be stored in a storage medium such as an IC card chip or a two-dimensional bar code and may be received and transmitted via the storage medium.

According to the embodiment, the mobile terminal 140 previously stores the program for executing the processing shown in the flowcharts of FIGS. 13 to 15. However, the present invention is not limited to this, and the mobile terminal 140 may not store the program, only the positional information may be transmitted to the received program, and the object information and the service information may be read by executing the program. Thus, a new service can be received without changing the internal setting of the mobile terminal 140 only by changing the program of the virtual object management device 100.

According to the embodiment, the object information and the service information are stored in the virtual object management device 100. However, the present invention is not limited to this, and the object information and the service information may separately be stored in devices. Further, only access information (e.g., short cut) for accessing the object information and the service information may be stored in the virtual object management device 100. In this case, the mobile terminal 140 obtains the access information from the virtual object management device 100 and the object information and the service information are obtained based on the access information.

According to the embodiment, the control program which is previously stored in the ROM 32 is executed when executing the processing shown in the flowcharts of FIGS. 5 to 7. However, the present invention is not limited to this, and the program indicating the sequence in FIGS. 5 to 7 may be read to the RAM 34 from a storage medium for storing the program and may be executed.

Further, according to the embodiment, the control program which is previously stored in the ROM 72 is executed when executing the processing shown in the flowcharts of FIGS. 9 to 11. However, the present invention is not limited to this, and the program indicating the sequence in FIGS. 9 to 11 may be read to the RAM 74 from a storage medium for storing the program and may be executed.

Furthermore, according to the embodiment, the control program which is previously stored in the ROM 92 is executed when executing the processing shown in the flowcharts of FIGS. 13 to 15. However, the present invention is not limited to this, and the program indicating the sequence in FIGS. 13 to 15 may be read to the RAM 94 from a storage medium for storing the program and may be executed.

Herein, the storage medium can include a semiconductor storage medium such as a RAM and a ROM, a magnetic storage type storage medium such as an FD and an HD, an optical reading type storage medium such as a CD, a CDV, an LD, and a DVD, and a magnetic storage type/optical reading type storage medium such as an MO. The storage medium includes any of computer-readable storage mediums, irrespective of digital, magnetic, and optical reading methods.

According to the embodiment, the display control system, the display service providing system, display control program, and the display control method are applied to the case in which, as shown in FIG. 1, in the meeting place for the presentation, the spherical virtual object A is arranged and set to the area surrounding the projector 200, the virtual objects B and C are individually arranged and set to the area surrounding the mobile terminal 140 and the card 160 used by the presenter, and when the virtual object A is overlapped with the virtual object B or the virtual object A is overlapped with the virtual object C, the projecting service is started based on the projector display data by the projector 200. However, it should be understood that the present invention is not limited to this and can be applied to other cases without departing from the spirit and scope of the invention.

As described above, in the display control system according to the present invention, when temporarily inserting and displaying display data different from display data used for current display operation, the non-display portion of the original display data is continuously displayed without any operation after the insertion and display operation. Therefore, the presentation contents can dynamically be changed with ease depending on the audience's reaction upon presentation. As compared with the related arts, advantageously, the flexible and smooth presentation can be performed.

In the display service providing system according to the present invention, when temporarily inserting and displaying display data different from display data used for current display operation, non-display portion of the original display data is continuously displayed without any operation after the insertion and display operation. Therefore, the presentation contents can dynamically be changed with ease depending on the audience's reaction upon presentation. As compared with the related arts, advantageously, the flexible and smooth presentation can be performed. Further, the virtual object has the shape and the arrangement position, and it is determined whether or not the area of the first virtual object is overlapped with the area of the second virtual object. With the above-mentioned structure, as compared with the related arts, the area for providing the display service is relatively clear. Thus, the varied display services depending on fine unit such as several-meter unit can be provided. Further, since the area for providing the display service and the area corresponding to the mobile device have not the point but the predetermined range, advantageously, the user can easily receive the display service. Only the user brings the mobile device to the first virtual object or adjacently thereto, thus receiving the display service. Not only the user can relatively easily receive the display service but also the user can substantially be specified. Advantageously, the display service can be provided in accordance with the user.

Further, in the display service providing system according to the present invention, the virtual object management device determines the information. Thus, advantageously, the processing load of the mobile device can be reduced.

Furthermore, in the display service providing system according to the present invention, the mobile device determines the information. Thus, advantageously, the processing load of he virtual object management terminal can be reduced.

Moreover, in the display service providing system according to the present invention, advantageously, not only the display service can relatively easily be received by the projection-type display device but also the display service corresponding to can be provided.

In the display control program according to the present invention, advantageously, the same advantages as those of the above display control system are obtained.

In the display control program according to the present invention, the same advantages as those of the above-described display control system are obtained.

Moreover, in the display control method according to the present invention, the same advantages as those of the above display control system are obtained.

In addition, in the display control method according to the present invention, the same advantages as those of the above display control system are obtained.

The invention claimed is:

1. A display control system that displays each page in predetermined order based on given display data when display data, including one or plural page data which have display contents segmented by page unit, are given to the display control system comprising:
    a display device; and
    a display control device that determines an initial display control operation so that the pages are displayed on said display device in the predetermined order based on initial display data,
    wherein the display control device stores, as a return pointer, a position of a currently displayed page among the initial display data used for the initial display control operation when any subsequent display data is received by the display device during the initial display control operation;
    wherein the display control device suspends the initial display control operation based on the initial display data when the subsequent display data is received by the display device and starts a subsequent display control operation based on the subsequent display data received by the display device; and
    wherein the display control device returns the currently displayed page of the initial display control operation based on the initial display data and the stored return pointer when the subsequent display control operation based on the subsequent display data suspends or ends.

2. A display control program stored in memory and executed by a computer, connected to a display device, comprising:
    instructions for, when the program is given initial display data which have display contents segmented by page unit, executing processing implemented by a display control device that determines an initial display control operation for displaying pages on said display device in a predetermined order based on the given initial display data;
    instructions for the display control device storing, as a return pointer, a position of a currently displayed page among the initial display data used for the initial display control operation when any subsequent display data is received by the display device during the initial display control operation;
    instructions for the display control device suspending the initial display control operation based on the initial display data when the subsequent display data is received by the display device and starting a subsequent display control operation based on the subsequent display data received by the display device; and
    instructions for the display control device returning the currently displayed page of the initial display control operation based on present display data and the stored return pointer when the subsequent display control operation based on the subsequent display data suspends or ends.

3. A display control method to be executed by a display control device comprising:
    a receiving step of receiving initial display data which have display contents segmented by page unit;
    a displaying step of displaying pages in a predetermined order based on the initial display data:
    a return pointer storing step of, receiving subsequent display data by the display control device during an initial display operation, and storing, as a return pointer, the position of the page during the initial display operation among the initial display data used for the initial display operation;
    a display switching step of, when the subsequent display data is received by the display control device during the initial display operation, the display control device determining to suspend the initial display operation based on the initial display data and starting a subsequent display operation based on the subsequent display data received by the display control device; and
    a display returning step of, when the subsequent display operation based on the subsequent display data suspends or ends, returning the currently displayed page of the initial display control operation on the basis of the initial display data and the return pointer stored in said return pointer storing step.

* * * * *